United States Patent
Ramer et al.

(10) Patent No.: US 7,706,591 B2
(45) Date of Patent: Apr. 27, 2010

(54) NEURONAL PROFILING

(75) Inventors: Everett Ramer, Pittsburgh, PA (US); Oleg P. Lapets, Allison Park, PA (US)

(73) Assignee: Cellomics, Inc., Pittsburgh, PA (US)

( * ) Notice: Subject to any disclaimer, the term of this patent is extended or adjusted under 35 U.S.C. 154(b) by 660 days.

(21) Appl. No.: 11/486,326

(22) Filed: Jul. 13, 2006

(65) Prior Publication Data

US 2008/0015786 A1 Jan. 17, 2008

(51) Int. Cl.
- *G06K 9/00* (2006.01)
- *G01N 33/53* (2006.01)
- *G01N 33/56* (2006.01)

(52) U.S. Cl. .................. 382/133; 382/132; 435/288.7; 702/19

(58) Field of Classification Search ........................ None
See application file for complete search history.

(56) References Cited

U.S. PATENT DOCUMENTS

| | | | |
|---|---|---|---|
| 5,436,128 | A | 7/1995 | Harpold et al. |
| 5,491,084 | A | 2/1996 | Chalfie et al. |
| 5,764,792 | A * | 6/1998 | Kennealy .................. 382/133 |
| 5,790,710 | A | 8/1998 | Price et al. |
| 6,573,039 | B1 | 6/2003 | Dunaly et al. |
| 6,620,591 | B1 * | 9/2003 | Dunlay et al. ............... 435/7.2 |
| 6,671,624 | B1 | 12/2003 | Dunaly et al. |
| 6,902,883 | B2 | 6/2005 | Dunaly et al. |
| 6,986,993 | B1 | 1/2006 | Ghosh et al. |
| 7,060,445 | B1 | 6/2006 | Dunaly et al. |
| 7,117,098 | B1 | 10/2006 | Dunaly et al. |
| 2002/0004632 | A1 | 1/2002 | Lindquist et al. |
| 2004/0009539 | A1 | 1/2004 | Dunlay et al. |
| 2004/0063162 | A1 | 4/2004 | Dunlay et al. |
| 2005/0273271 | A1 | 12/2005 | Rao et al. |
| 2006/0014137 | A1 | 1/2006 | Ghosh et al. |

FOREIGN PATENT DOCUMENTS

| | | |
|---|---|---|
| WO | 9838490 | 9/1998 |
| WO | 0111340 A1 | 2/2001 |
| WO | WO 03/095986 A | 11/2003 |

OTHER PUBLICATIONS

Koh Y.Y. Automated Recognition Algorithms for Neural Studies. Ph.D. Dissertation, State University of New York at Stony Brook, 2001.*
Barber et al. (1996), Neuroscience Letters 207:17-20.
Bright et al. (1996), Cytometry 24:226-233.
McNeil (1989) in Methods in Cell Biology, vol. 29, Taylor and Wang (eds.), pp. 153-173.
Cubitt et al. (1995), Trends in Biochemical Science 20:448-455.
Pierre Soille, Morphological Image Analysis: Principles and Applications, Springer-Verlag, Berlin, 2004, p. 105 & 268.
Rafael Gonzalez and Richard Woods, Digital Image Processing, Addison-Wesley, Reading, Massachusetts, 1992, p. 441-442.
Bernd Jähne, Digital Image Processing, 5th edition, Springer-Verlag, Berlin, 2002, p. 427-432.
He, et al. (2003), Microscopy and Microanalysis, 9:296-310.
Cohen, et al. (1994), Journal of Microscopy, 173(2):103-114.
Meijering, et al. (2004), Cytometry Part A, 58A:167-176.
Weaver, CA (2003), "Automated Morphometry for Neural Cells," A Dissertation presented at State University of New York at Stony Brook.
Dow, et al. (1996), Cytometry, 25:71-81.
Lieske, et al. (1989), Neuroscience, 90(3):967-974.
Wang, et al. (2001), Pure and Applied Chemistry, 73(10):1599-1611.
Lee et al. (1995), Journal of Biological Chemistry, 270(10):5600-5605.
Ramakers et al. (1998), Developmental Brain Research, 108:205-216.
Ranefall, et al. (1997), Analytical Cellular Pathology, 15:145-156.
Taylor et al. (1996), Optical Diagnostics of Living Cells and Biofluids, 2678:15-27.
Taylor, et al. (1992), American Scientist, 80:322-335.
Schroeder, et al. (1996), Journal of Biomolecular Screening, 1(12):75-80.
McFarlane, et al. (1995), Clinical Experimental Pharmacology and Physiology, 22:362-363.

* cited by examiner

*Primary Examiner*—Michael Borin
(74) *Attorney, Agent, or Firm*—McDonnell Boehnen Hulbert & Berghoff LLP

(57) ABSTRACT

The present invention provides automated methods for cell body extension analysis, software for carrying out such methods, and detection devices comprising such software.

21 Claims, 15 Drawing Sheets

Ordinary Skeleton Points

Critical Skeleton Points

_US 7,706,591 B2_

NEURONAL PROFILING

BACKGROUND OF THE INVENTION

Drugs that promote neuron development, and thus neurite outgrowth, will be of use for treating a wide variety of diseases and trauma that result in neuropathy and nerve injury, including but not limited to spinal cord injury, neuropathy resulting from diseases such as diabetes and stroke, Parkinson's disease, and other forms of dementia including Alzheimer's disease.

The most frequently used methods for neurite outgrowth quantification and analysis are based on manual or, in some cases, on semiautomatic imaging tools for neurite tracing. Automated neurite tracing, however, is a prerequisite for the use of neurite outgrowth analysis in high content screening. Automated tracing of neurites in a population of cells is difficult due to ambiguities caused by neurite intensity variations and multiple neurite crossings, or tangles, which are created when a neurite cross itself or another neurite.

Thus, improved methods for analyzing neurites and neurite outgrowth would be of great value in the art.

SUMMARY OF THE INVENTION

In one aspect, the present invention provides an automated method for cell body extension analysis, comprising:

(a) obtaining a cell body image and a cell body extension image from cells in a population of cells comprising cells with cell body extensions, wherein the cells and cell body extensions are labeled with reporters, and wherein the cell body image and the cell body extension image are obtained from signals emitted by the reporters;

(b) processing the cell body image to create a cell body mask and to validate cell bodies in the cell body mask, and processing the cell body extension image to create a cell body extension mask, which is processed to produce a cell body extension skeleton;

(c) untangling cell body extensions, wherein the untangling comprises:
  (i) identifying end points on the cell body extension skeleton;
  (ii) identifying and removing critical points from the cell body extension skeleton; and
  (iii) tracing the end points and the critical points to untangle cell body extensions in the cell body extension skeletons; and (d) assigning untangled cell body extensions to the validated cell bodies.

In a preferred embodiment, the cell body extensions comprise neurites.

In a second aspect, the present invention provides a machine readable storage medium comprising a set of instructions for causing a detection device to carry out the methods of the first aspect of the invention.

In a third aspect, the present invention provides detection devices comprising the computer readable storage media of the second aspect of the invention.

DETAILED DESCRIPTION OF THE INVENTION

Figure 1:
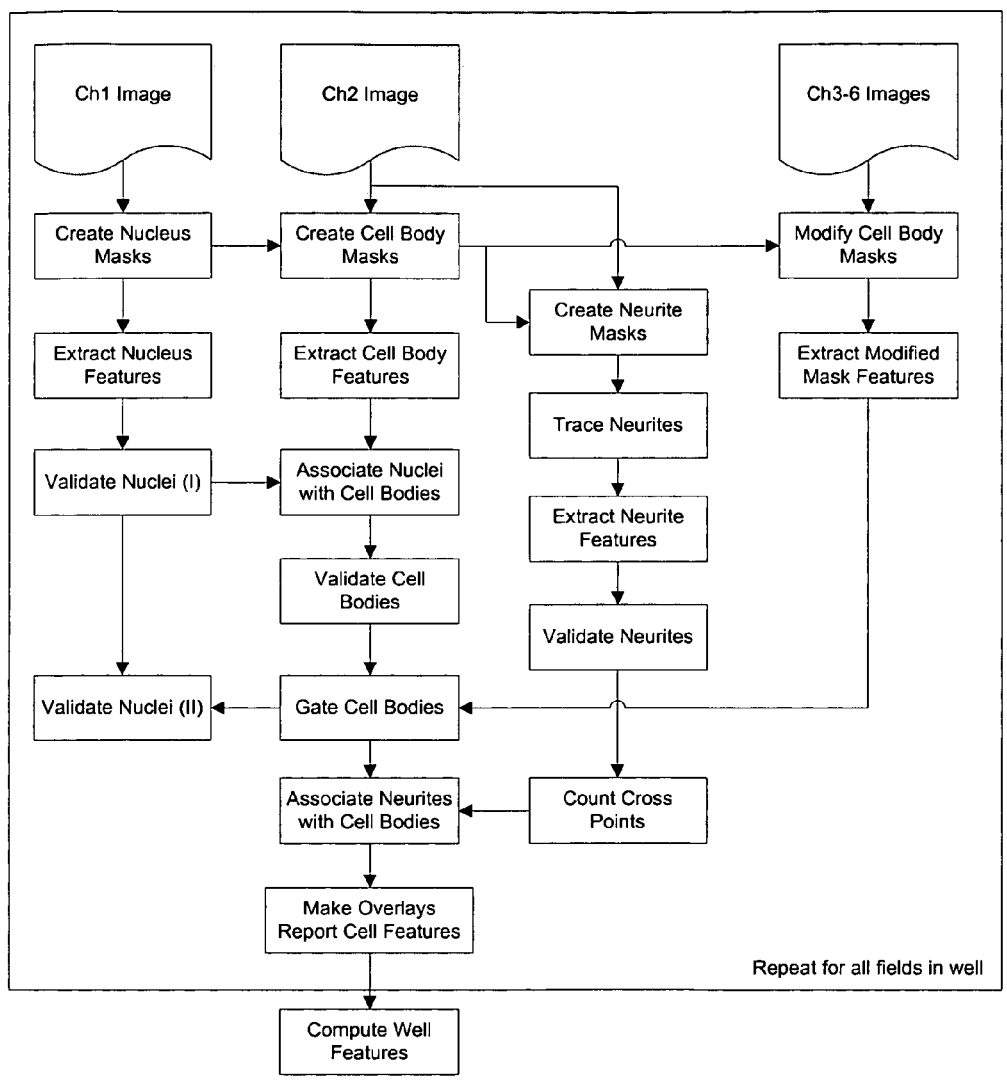
FIG. 1 is a flowchart outlining a sequence of image processing and analysis steps employed in one embodiment of the methods of the invention.

All publications, patents and patent applications cited herein are hereby expressly incorporated by reference for all purposes.

As used herein, the singular forms "a", "an" and "the" include plural referents unless the context clearly dictates otherwise. For example, reference to a "reporter" means one or more reporters.

In a first aspect, the present invention provides automated methods for cell body extension analysis, comprising:

(a) obtaining a cell body image and a cell body extension image from cells in a population of cells comprising cells with cell body extensions, wherein the cells and cell body extensions are labeled with reporters, and wherein the cell body image and the cell body extension image are obtained from signals emitted by the reporters;

(b) processing the cell body image to create a cell body mask and to validate cell bodies in the cell body mask, and processing the cell body extension image to create a cell body extension mask, which is processed to produce a cell body extension skeleton;

(c) untangling cell body extensions, wherein the untangling comprises:
  (i) identifying end points on the cell body extension skeleton;
  (ii) identifying and removing critical points from the cell body extension skeleton; and
  (iii) tracing the end points and the critical points to untangle cell body extensions in the cell body extension skeletons; and (d) assigning untangled cell body extensions to the validated cell bodies.

As used herein, the "cell body extensions" can be any type of extension from a cell body that can become "tangled" for purposes of image analysis of the cell body extensions from a given cell body. Exemplary cell body extensions are neurites and pseudopodia. Image analysis of pseudopodia is useful, for example, in screening of pharmacological agents that either stimulate or inhibit pseudopodia formation. A more detailed discussion of the uses of neurite analysis is provided below.

In a preferred embodiment, the methods of the first aspect of the invention comprise:

(a) obtaining a cell body image and a neurite image from cells in a population of cells comprising neurons, wherein the cells and neurites are labeled with reporters, and wherein the cell body image and the neurite image are obtained from signals emitted by the reporters;

(b) processing the cell body image to create a cell body mask and to validate cell bodies in the cell body mask, and processing the neurite image to create a neurite mask, which is processed to produce a neurite skeleton;

(c) untangling neurites, wherein the untangling comprises:
(i) identifying end points on the neurite skeleton;
(ii) identifying and removing critical points from the neurite skeleton; and
(iii) tracing the end points and the critical points to untangle neurites in the neurite skeletons; and (d) assigning untangled neurites to the validated cell bodies While the remaining disclosure focuses on neurite analysis, those of skill in the art will recognize that the methods of the invention apply to analysis of other cell body extensions, as discussed above.

The imaging in step (a) and the image processing in step (b) can be carried out in any order. Thus, the cell body image can be obtained first; the neurite image can be obtained first, or the two images can be obtained at the same time. Similarly, the cell body mask can be obtained first, the neurite mask and neurite skeleton can be obtained first, or the masks (and neurite skeleton) can be obtained simultaneously.

For example, when the cell body image and neurite image are obtained (acquired) independently (as discussed in more detail below), any order of processing/analysis of cell body image and neurite image can be used. When a combined cell body image/neurite image is used (as discussed in more detail below), it is preferred that the cell body image is processed first and validated cell bodies identified prior to neurite image processing.

The methods of the invention provide a solution to the problem of automated tracing of neurites in a population of cells, where neurites overlap. The methods provide for identification of the origin and growth direction of the neurites, allowing the accurate untangling of neurite structures in two-dimensional images without artificial simplification of neurite structure or limitation of neurites to cell body zones of influence (ZOI) or equidistant regions around cell bodies. The methods of the invention also provide for significantly increased speed in automated neurite analysis.

As used herein, "a population of cells comprising neurons" includes any cell population comprising neurons of any type, including, but not limited to, primary cultures of brain cells that contain neurons, isolated cell cultures comprising primary neuronal cells, neuronal precursor cells, tissue culture cells that are used as models of neurons (such as PC12 cells, which are a neoplastic neuronal cell line cloned from rat pheochromocytoma), or mixtures thereof. As will be apparent to those of skill in the art, the population of cells can include both neurons and non-neuronal cells, thus permitting the use of primary cultures, etc.

As used herein, the term "neurite" refers to any processes and/or structures that grow from a neuron's cell body including but not limited to axons, dendrites, neurites, intermediate segments, terminal segments, filopodia and growth cones.

The reporters can be any molecules, compound, or substance that can bind to a target of interest for the purposes of the invention and which can emit signals capable of being processed to obtain a neuron image and a neurite image. Examples of such reporters include, but are not limited to radioisotope markers, fluorescent markers, luminescent markers, and electrochemical markers. In a preferred embodiment for high content screening purposes, fluorescent markers are used. Such fluorescent markers include, but are not limited to, dyes, quantum dots, fluorescent molecules (including but not limited to green fluorescent protein and related fluorescent proteins), and fluorescently labeled molecules (including but not limited to fluorescently labeled antibodies and ligands). Such fluorescent reporters may be expressed as fluorescent reporters by the cells, added to the cells as fluorescent reporters, or fluorescently labeled by contacting the cell with a fluorescently labeled molecule, compound, or substance that binds to the reporter, including but not limited to dyes and primary or secondary antibodies that bind to the reporter. Fluorescent reporters may be expressed by transfected cells or added to the cells via non-mechanical modes including, but not limited to, diffusion, facilitated or active transport, signal-sequence-mediated transport, and endocytotic or pinocytotic uptake; or combinations thereof, at any time during the screening assay. Mechanical bulk loading methods, which are well known in the art, can also be used to load fluorescent probes into living cells (Barber et al. (1996), *Neuroscience Letters* 207:17-20; Bright et al. (1996), *Cytometry* 24:226-233; McNeil (1989) in *Methods in Cell Biology*, Vol. 29, Taylor and Wang (eds.), pp. 153-173). These methods include, but are not limited to, electroporation and other mechanical methods such as scrape-loading, bead-loading, impact-loading, syringe-loading, hypertonic and hypotonic loading. Additionally, cells can be genetically engineered to express fluorescent reporters, such as green fluorescent protein (GFP), coupled to a protein of interest (Chalfie and Prasher U.S. Pat. No. 5,491,084; Cubitt et al. (1995), *Trends in Biochemical Science* 20:448-455). Fluorescently labeled antibodies are particularly useful reporters, due to their high degree of specificity for attaching to a single molecular target in a mixture of molecules as complex as a cell. The fluorescent reporters that a given cell possesses may all be introduced to the cells via the same technique, or via any combination of such techniques.

Exemplary targets for the reporter molecules include, but are not limited to, neuron-specific targets, such as neurofilaments, βIII-tubulin, and neurotrophic factors such as the ciliary neurotrophic factor (CNTF), all being neuron-specific antigens and proteins. In other embodiments, the target can include, but is not limited to:

Cytoplasm: The cytoplasm can be reported on, for example, with any standard cytoplasmic stain. Examples of such stains are CMFDA (chloromethyl fluorescein diacetate), or CMTMR (chloromethyl tetramethylrhodamine) (Molecular Probes). Alternatively, the cells can be engineered to express an autofluorescent protein such as Green Fluorescent Protein (GFP). The expressed GFP in the cytoplasm allows the cell body and/or neurite to be visualized.

Membrane: The membrane can be reported on, for example, by any standard lipid dye or by labeled membrane proteins. Examples of such standard lipid dyes include, but are not limited to, diI (dioctadecylindocarbocyanine) (Molecular Probes). To fluorescently label membrane proteins, one can use either immunofluorescence against cell surface proteins (using standard immunofluorescent staining techniques) or a fluorescent ligand that binds a membrane protein. This strategy can serve a dual purpose in that, in addition to identifying the neuron shape and neurites, it can also be used to specifically and selectively identify neurons from a mixed brain culture. Examples of neuron specific markers that are on the membrane are the various neurotrophic factors. For example, indirect immunofluorescence against the ciliary neurotrophic factor CNTF on the surface of neurons can delineate the architecture of the neuron.

Cellular Proteins: As noted above, as well as, for example, cytoskeletal proteins that are not neuron specific.

A combination of all of these targets can also be used to better identify the neurons and neurites.

In one embodiment, the cell body and neurite images are obtained from signals emitted by the same reporter, which can include any of the reporters discussed above. In this embodiment, the cell body and neurite images are combined into a single image, and subsequent mask creation results in a combined cell body-neurite mask. The cell body and the neurites can be combined into a single image because both contain the same reporter. The cell body mask and the neurite mask (see below) are separated during image analysis using any appropriate image processing technique, including but not limited to shape-sensitive image processing methods, such as erosion followed by conditional reconstruction (See, for example, U.S. Pat. No. 6,986,993) and morphological opening (Pierre Soille, *Morphological Image Analysis: Principles and Applications*, Springer-Verlag, Berlin, 2004, p. 105). Thus, the methods of the invention only require use of a single imaging channel. Any of the reporters/targets described above can be used in this embodiment.

In an alternative embodiment, the cell body and neurite images are obtained from signals emitted by different reporters. In this embodiment, the cell body image and the neurite images are obtained separately, and the separate images are separately processed to obtain the cell body mask and the neurite skeleton mask, respectively. Subsequent steps in the two embodiments are preferably the same. In this embodiment, two imaging channels are required for high content image analysis, as spectrally distinguishable reporters are used to report on the cell body and the neurites, respectively. Any of the reporters/targets described above can be used in this embodiment.

Creation of cell body mask from the cell body image and neurite mask from the neurite image can be accomplished using standard techniques in the art. For example, the image can be scanned pixel-by-pixel, assigning a value 0 to background pixels and a value 1 to object pixels. This assignment can be done based on ranges of the pixel values (e.g., object pixels may have significantly larger values than background pixels). The mask can embody the shapes and sizes of the objects, and their locations, but does not embody features like texture or perspective (by shading). Such a mask can be laid on top of the original image and cut around all the "1" pixels to separate the objects from the background. (Rafael Gonzalez and Richard Woods, *Digital Image Processing*, Addison-Wesley, Reading, Mass., 1992, p. 443; Bernd Jähne, *Digital Image Processing*, 5$^{th}$ edition, Springer-Verlag, Berlin, 2002, p. 427.) The neurite mask can then be used to create a neurite skeleton, as discussed in detail below.

Other imaging channels can be added as desired, for example, when using other reporters that are spectrally distinguishable from the reporters whose signals are used to obtain the cell body and neurite images. In one embodiment, a nuclear reporter (a reporter that reports on the nucleus) can be used, and the method further comprises obtaining a nuclear image from the signals emitted by the nuclear reporter. In this embodiment a further channel is used to obtain images from the nuclear reporters; this requires the use of nuclear reporters that are spectrally distinguishable from the reporters whose signals are used to obtain the cell body and neurite images. In this embodiment, it is further preferred to process the nuclear image to obtain a nuclear mask, and further preferred to segment nuclear mask objects (ie: objects defined by nuclear masks). Segmentation of the nucleus mask objects improves the accuracy of the cell count by separating touching objects. The method can further comprise computing nucleus features to validate identified nuclei (according to user-defined parameters).

Analysis of nuclei provides additional information that can be useful in its own right, and is also useful in the subsequent analysis of cell bodies. For example, creating the cell body mask may be complicated by holes (dark regions) in the neuron image caused by the displacement of the reporters by the nucleus. It is preferred that such holes, if present, are filled. Since these holes correspond to nuclei, they can be filled, for example, by pasting objects from the nuclear mask. Thus, in a further embodiment, the methods of this first aspect further comprise comparing the nuclear mask to the cell body mask to fill holes in the cell body mask. It is further preferred that this comparison comprises a co-localization test between nucleus objects and cell body objects before pasting nuclear objects that co-localize with holes in the cell body mask. The co-localization test is preferably performed before pasting because there may be objects in the nucleus mask that do not correspond to holes in the cell body mask. If one of these objects were pasted into the cell body mask, a new cell body mask object could be created. The co-localization test verifies that a hole is being filled in an existing cell body mask object, and that a new cell body mask object is not being created.

In a further optional embodiment, an exemplary co-localization test between nuclear objects and holes in the cell body mask comprises:

(i) creating a test ring around each nucleus mask object;
(ii) measuring contiguities between the test rings and cell body mask objects; and
(iii) pasting nucleus mask objects that pass a contiguity test into the cell body mask.

The goal of this embodiment is to create a ring around each nuclear mask object that is one pixel wide and is bigger than the hole in the cell body mask, but not so big that it is bigger than the cell body mask object that contains the hole. This test ring can be created, for example, by dilating the boundary of the nuclear mask objects. Because of resolution effects in the image, the number of dilations of the boundary is proportional to the magnification of the microscope objective used. The contiguity between a nuclear mask object and the cell body mask can be measured, for example, as the fraction of the nuclear object's test ring pixels that overlap pixels in the cell body mask. If the contiguity is sufficient, it is assumed that pasting the nuclear mask object into the cell body mask will fill an existing hole in the latter, and not create a new cell body mask object. The level of contiguity required for pasting can be specified as a user input-parameter. Those of skill in the art will recognize that other co-localization tests can be utilized in conjunction with the methods of the invention.

This hole filling method is simple and convenient since there are two imaging channels: the first contains plugs and the second contains holes. However, there may be more plugs than holes, so a co-localization test is preferable to prevent the filling of nonexistent holes (which would create false objects in the second channel). It may be possible to fill the holes without pasting plugs from a different imaging channel. In this case the nucleus imaging channel and the hole-filling co-localization test would be obviated. For example, the dark regions within cell bodies are slightly brighter than the spaces between cell bodies because they are not really empty, since the dark regions are enclosed within the cell membrane (and are viewed through it) and are occupied by something (e.g., nucleus). The cell membrane and nucleus may not contain the reporter, but still will have a small signal from these anyway. Thus, the signal from the dark regions within the cells is greater than the signal from the true background regions between cells. As a result, one can use the strong signals from the bright regions of the cell bodies as markers to localize the search for the weak signals that differentiate between dark cellular regions and the background between cells. (See, for example, Bernd Jähne, *Digital Image Processing*, 5th edition, Springer-Verlag, Berlin, 2002, p. 432.)

Based on the teachings herein, those of skill in the art will recognize that other co-localization and hole-filling techniques can also be used in accordance with the present invention.

Use of a nuclear channel may also be preferred for various other purposes, including but not limited to measuring the neuronal/non-neuronal population ratio in a mixed culture of cells. Channels can also be added, for example to distinguish cells based on the presence of other reporters; for example, neurotransmitters or cellular dyes.

In embodiments where nuclear reporters are used, the nucleic acid dye Hoechst 33342 is a preferred nuclear reporter to identify the nuclei of all the cells in the cell population. However, other nuclear reporters can also be used. Nucleic acid fluorescent stains are of two kinds: those that can cross the plasma membrane of live cells, and those that are membrane impermeant. Examples of membrane permeant nucleic acid stains include DAPI, dihydroethidium, hexidium iodide, Hoechst 33258, and the SYTO® dye series (Molecular Probes). To label nuclei with membrane-impermeant dyes, the plasma membrane has to be permeabilized. Examples of membrane-impermeant nucleic acid dyes include cyanine nucleic acid labels such as TOTO®, YOYO®, BOBO™, POPO™, TO-PRO®, YO-PRO®, BO-PRO™ and PO-PRO™ (Molecular Probes), ethidium analogs such as ethidium-acridine heterodimer, ethidium bromide, ethidium diazide and ethidium homodimers 1 and 2, propidium iodide, and the green nucleic acid stain SYTOX® (Molecular Probes).

In a preferred embodiment, creation of cell body objects comprises smoothing of cell body object boundaries. In a preferred embodiment where a combined cell body-neurite mask is obtained, the smoothing process comprises removing neurites from the combined cell body-neurite mask, to facilitate cell body segmentation. Neurite removal can be accomplished by any appropriate means, including but not limited to using a sequence of erosions and dilations (see FIG. 4). In embodiments where hole-filling is carried out, neurite removal can occur after hole-filling, particularly if neurite removal is based on erosion. Based on the teachings herein, those of skill in the art will recognize that other neurite removal techniques can also be used in accordance with the present invention, including those that do not require erosion, and where the order of hole-filling and neurite removal is optional.

In a further preferred embodiment, following neurite removal, cell body objects are segmented to separate cell bodies that might touch or overlap. Such segmentation can be carried out by any appropriate method, including but not limited to those disclosed in the examples that follow. In one embodiment, the touching cell body mask objects are segmented based on either the shape of their aggregate boundary, or based on the distribution of intensity within their aggregate boundary. The user can specify which method is used via the input parameters. The user also has the option, again through the input parameters, of using the valid nuclear mask objects to improve the segmentation results. For example, if it is known that each neuron contains exactly one nucleus, using the nuclear mask objects can prevent the segmentation of an agglomerated cell body object into objects that contain multiple, or no, nuclei. Also use of the nuclear mask objects prevents segmentation of an agglomerated cell body object along lines that would cross, or split a nuclear object. In a further preferred embodiment, the segmented cell bodies are then compared with the cell body validation criteria in the assay protocol, thus validating cell body objects as neuron cell bodies (ie, "validated cell bodies"). As used herein, the term "validated" means identified as meeting user-defined selection/rejection criteria, such as size, shape, and/or intensity.

Based on the teachings herein, those of skill in the art will recognize that other segmentation techniques can also be used in accordance with the present invention. In one further embodiment, segmentation comprises:

1. Objects from the nucleus mask (if obtained), and or co-localization with nuclei, can be used in this process, as selected by the user;
2. Cell body segmentation seeds are identified via any technique known to those of skill in the art using: either (a) nucleus mask objects; or (b) seeds derived from cell body shape and/or intensity distribution. As used herein, a "seed" is the core of an object. Obtaining seeds is well within the level of skill of those in the image analysis field;
3. Cell bodies are segmented using the seeds obtained in #2, with or without gradients derived from neuron cell body shape and/or intensity distribution to obtain neuron cell body mask objects. As is well understood by those of skill in the image analysis field, such gradients determine how fast a seed grows in various directions; if there is no gradient, a seed grows into a circular object. For example, by using gradients related to the boundary shape a seed corresponding to a larger object can be made to expand faster than a seed corresponding to a smaller object. This will result in a more accurate dividing line between touching objects of differing sizes As discussed above, using nuclear mask objects can prevent doing non-biologically reasonable segmentation—creating cell bodies without nuclei or having the cell body dividing line split a nucleus. Using gradients can improve the accuracy of the division by allowing other factors to influence the "geometry" of the split. (See, for example, Pierre Soille, *Morphological Image Analysis: Principles and Applications*, Springer-Verlag, Berlin, 2004, p. 268.);
4. Cell body objects are segmented: Incomplete neurite removal and neuron cell body segmentation can create isolated objects in the cell body mask that may not be cell bodies. These artifacts are identified using a nucleus co-localization test and are removed from the cell body mask.

As will be apparent to those of skill in the art, any type of co-localization test can be used. In one-non-limiting example, this process comprises (a) creating a test ring inside each nucleus mask object; (b) measuring contiguities between test rings and cell body mask objects; and (c) those objects that fail the contiguity test are eliminated. The test ring used here is different than the one used in the fill holes procedure (see above). Prior to hole filling, the co-localization is tested externally to the nucleus mask object, but subsequent to hole filling it can be tested internally to the nucleus mask object.

Thus, in various non-limiting embodiments, the methods of this first aspect can optionally comprise two distinct co-localization tests. The first co-localization test (described above) is between an object and a hole (nucleus and hole in a cell body), thus the test ring is outside the nucleus. The second co-localization test is between two objects (nucleus and cell body) and the test ring is inside the nucleus (the smaller of the two objects). Given a set of nucleus objects and a set of cell body objects, the user can specify how many nuclei, if any, are required to belong to each cell body. The second co-localization test counts the number of nuclei that belong to each cell body. Cell body objects that fail to have the required number are eliminated.

In a further embodiment, the cell body mask is used by other imaging channels to detect and measure additional reporters that might also be in the cell, and thus to obtain further information about the neuron in question For example, intensity measurements obtained from secondary channels (primary channels are those where cell body/neurite/nucleus masks are defined) can be used for "gating"—selection of one or more subpopulations of cells on the basis of measurements from the secondary channels. In one non-limiting example of gating,: a first channel (nucleus) and a second channel (cell body) are used for cell body detection and validation; channels 3, 4, 5, and 6 can then be used for gating selection of subsets of cells with cell bodies that meet cell body selection/rejection criteria as defined by the user for these additional channels. The user can thus set the criteria so as to identify different subpopulations of cells in each additional channel. These measurements of additional reporters can be used, for example, to identify specific sub-populations of neurons in the a mixed cell population, or to eliminate certain neurons from the analysis process. It will be understood by those of skill in the art that this step can be carried out at any time during the method subsequent to obtaining the cell body mask. As will also be apparent to those of skill in the art, the approximate region of the cell body mask can be used in other imaging channels, by physically aligning or spatially registering the image channels. Thus, the method may further comprise modifying the channel (ie: dilating or eroding the cell body mask in a particular channel, for example) to improve the accuracy of the results.

As will be understood by those of skill in the art, each channel may (but need not necessarily) correspond to a different filter configuration (wavelength). One could have, for example, channel 1 at wavelength A, channels 2 and 3 at wavelength B and channels 4 and 5 at wavelength C. In that instance, the settings from channel 2 may differ from channel 3 (and channel 4 from channel 5) as to a parameter other than wavelength For example, a neurite image may be acquired in more then one channel using the same wavelength and with a focal plane offset. Combining multiple channels with different focal planes could allow improved tracing of neurites that extend through different focal planes In a further embodiment, the cell bodies can then be selected for analysis based on the gating process. After cell bodies are selected for analysis, nuclei can again be validated, if desired, to reject any that might belong to cell bodies that were not selected for analysis.

Figure 6:
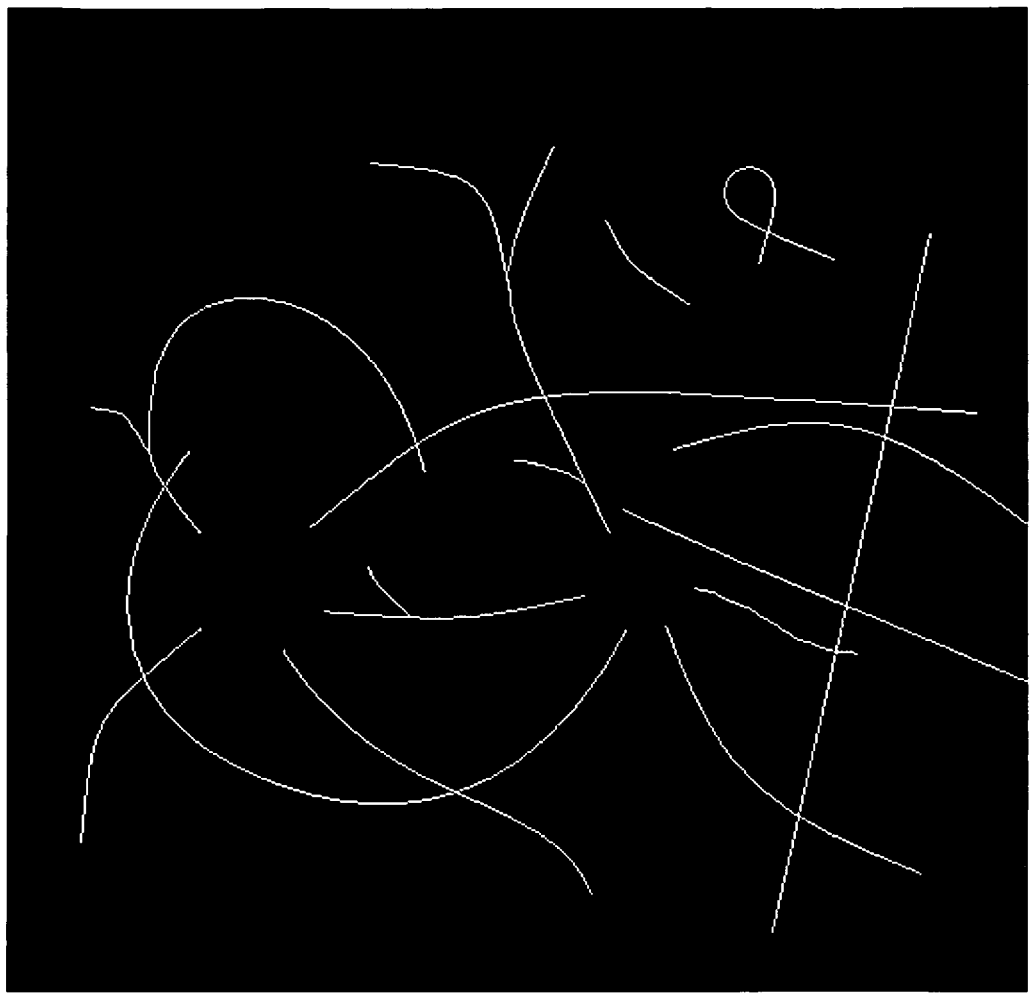
FIG. 6 is an example of a neurite skeleton obtained according to the methods of the invention.

The neurite mask is created from the neurite image using any suitable technique in the art, such as those masking techniques described above. An exemplary technique for neurite mask creation is provided in FIG. 8. Neurite images are obtained from signals from the reporters, as described above. The neurite mask is then processed to produce a neurite skeleton. The neurite skeleton is used for neurite tracing, to measure neurite length, and to identify branch and cross points (see below). The neurite mask is used to measure neurite width, area, and for neurite intensity measurements (see below). The cell body masks are preferably removed from both the neurite mask and its neurite skeleton (see FIG. 6) before these analyses.

In various embodiments for neurite mask production, the neurites within the mask might have small holes. A hole in a mask object could cause a loop in the medial axis (the medial axis will have to encircle the hole, and cannot go through it). In a neurite, a hole could thus create a loop in the neurite skeleton. This loop could be interpreted as a pair of false branch points. Thus, in a further optional embodiment, neurite holes are filled. In this embodiment, the holes are preferably filled prior to creation of the neurite skeleton using any appropriate technique; such hole-filling techniques are well known to those of skill in the image analysis arts.

In a preferred embodiment, the neurite skeleton is produced (also referred to herein as "skeletonization") by: reducing the neurite mask to lines that correspond to any boundary or internal axis of the neurite. As used herein the term "neurite skeleton" refers to a continuous structure that represents the shape of the neurite, including locations of end points and critical points, and the sequence of neurite skeleton segments that connect them. Neurites are filaments with, practically speaking, parallel boundaries. Thus, using either boundary, or any internal axis, such as the medial axis, will give the same result since these will all be parallel. In a further preferred embodiment, the lines comprise single pixel-width lines, which facilitate the untangling process. Based on the teachings herein, those of skill in the art will recognize that other skeletonization techniques can also be used in accordance with the present invention.

In a further preferred embodiment, the cell body masks are preferably removed from the neurite skeleton (where combination cell body-neurite masks were obtained) to identify the points where the neurites are attached to the cell bodies (initial points). Critical points where the neurite skeleton branches or crosses itself are also identified and are removed from the neurite skeleton to disassemble it into independent neurite segments.

As used herein the term "end points" refers to initial points (neurite attachment points to the cell body) or terminal points, which are the free ends of the neurites.

As used herein the term "critical points" refers to branch points (from single neurite) or cross points (one neurite crossing itself, or two or more neurites crossing each other). Critical points act as nodes connecting neurite skeleton segments.

In some cases, the skeletonization process may be incomplete. Thus, in a further embodiment, skeletonization optionally further comprises one or more of the following:

(i) pruning the neurite skeletons to remove single-pixel branches;

(ii) thinning the neurite skeletons to one pixel thick at all points;

(iii) identifying the critical points as crossing or a branch points based on a number of neurite skeleton segments that meet at each point; and (iv) smoothing discontinuities at neurite crossing points so these points are identified as a single cross point instead of a pair of closely spaced branch points.

Following skeletonization, the methods of the invention further comprise tracing the end points and critical points to untangle the neurites in the neurite skeleton. In a preferred embodiment, this process comprises:

(i) selecting an initial point and attaching its neurite skeleton segment to form a first neurite skeleton segment;

(ii) adding to the first neurite skeleton segment a first critical point touching the first neurite skeleton segment;

(iii) adding to the first critical point a second neurite skeleton segment that minimizes a kink angle at the first critical point and which is in the overall growth direction of the neurite;

(iv) repeating steps (ii)-(iii) a desired number of times, wherein the tracing serves to assign neurites to validated cell bodies.

In a preferred embodiment, steps (ii)-(iii) are repeated until a first traced neurite skeleton is complete. In a further embodiment, steps (i)-(iii) are repeated for one or more additional initial points on a cell body, more preferably for all of the initial points on a cell body. In a further preferred embodiment, the steps are continued until the additional traced neurite skeletons are complete.

As used herein, "tracing" means following the neurite from the initial point to the terminal point, through the critical points.

As used herein, "untangle" means determining which neurites belong to which neuron cell bodies, and which neurite segments belong to which neurites.

As used herein, the term "kink angle" means the deviation between the direction of the skeleton and the added neurite segment at the critical point.

As used herein, the term "neurite skeleton segment" refers to portions of the neurite skeleton from either an end point (or initial point) to a critical point, or from one critical point to another critical point.

The overall structure of the neurite skeleton is like a tree, with the critical points acting as the nodes that connect the neurite segments, or branches. The reassembly process begins with the root of the tree (initial point) and sequentially adds neurite segments and critical points until the terminal point, or end, of each branch is reached. After the addition of each critical point, the method attempts to add a neurite segment, which can be selected from a set of, possibly, several alternatives. In one embodiment, initial points are identified at touching point between the neurite skeleton and the cell body masks. This results in neurites that come out of the cell body at a wide range of angles, including tangential for neurites that just graze the cell body surface. In an alternative embodiment, the number of initial points is restricted to those growing radially outward from the cell body in a restricted range of allowed angle. In this embodiment, it is further preferred that a touching point is considered an initial point only if the direction of its attached neurite skeletal segment is within an allowed angle range; measured, for example, from the radial direction defined by the center of the cell body and the touching point. Neurite segments that touch cell bodies with angles outside the user-defined range would not form initial points. As used herein, attachment points are a subset of touching points. Touching points are identified and are evaluated, based on the angle the touching neurite makes with the cell body boundary. If the touching neurite is more radial than tangential, the touching point is considered an attachment point. The user can adjust the criterion via the input parameters.

When neurites cross each other, there is continuity in their individual directions. When neurites branch, one of the branches may continue in the original direction (main branch) and the other may go off in a new direction (secondary branch). The distinction between main and secondary branches is not critical to the methods of the invention. In a preferred embodiment, when adding a neurite segment to a critical point, the one that minimizes the kink angle (deviation between the direction of the neurite skeleton and the added neurite segment at the critical point) is selected.

The neurite trees grow radially outward from the cell body. Consequently neurite branching is biased in the direction of growth. (Branch angles are on average less than 90°). A theoretical ideal maximum kink angle is 90°, but lesser or greater maximal kink angles can be used in the practice of the current invention. Thus, maximal kink angles can include, but are not limited to, 75°, 80°, 85°, 90°, 95°, 100°, 105°, 110°, 115°, 120°, 125°, and 130°.

The kink angles at each critical point can be computed, for example, by determining the orientations of the segment ends that meet at that point, using any suitable technique in the art. Based on the teachings herein, those of skill in the art will recognize that other techniques for determining kink angles can also be used in accordance with the present invention.

Multiple neurons are present in most practical analysis contexts, and in these settings it is possible for a neurite to touch more than one cell body. Thus, the methods involve analysis to identify the cell body at which that neurite originates. In a preferred embodiment, assigning neurites to validated cell bodies comprises (i) tracing the neurite skeletons using available initial points, critical points and neurite skeleton segments;

(ii) tracing a neurite skeleton for each validated cell body that a neurite touches; and (iii) assigning the neurite to the validated cell body on which the neurite would have the overall longest length.

If a neurite touches more than one cell body, a neurite skeleton is traced for each of these cell bodies (i.e., it will be multiply traced, preferably using the rules described for the preferred embodiments above). Since neurite branching is biased in the direction of growth, the trace that follows the growth direction will be the longest. This is true because that trace will include the largest number of branches. Other tracing directions will encounter branches that do not satisfy the maximum kink angle criterion, and these branches can be excluded. The longest length criterion is only true if the neurite has branches. If the neurite does not have branches, all tracing directions will yield the same length. In cases of multiple realizations of identical length, one of the realizations can be selected at random, or via any other criteria deemed useful by the user.

Figure 14:
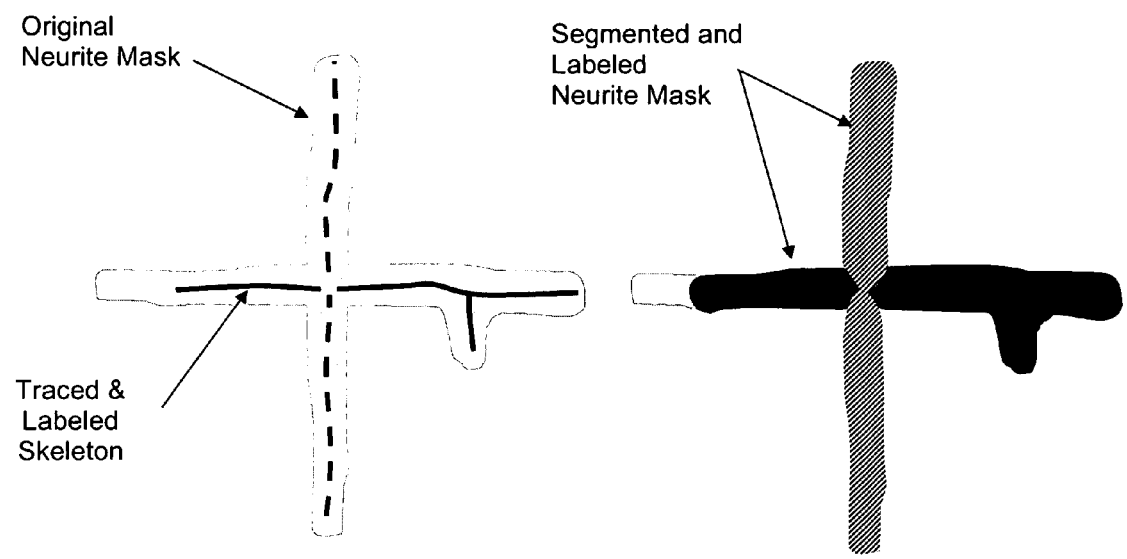
FIG. 14 is a diagram of segmentation of the neurite mask according to one embodiment of the invention.

At this point the neurite skeleton is untangled, while the neurite mask remains in its original state. In one optional embodiment, propagation of the untangled neurite skeleton to the neurite mask can be used to separate the neurite mask into untangled components and preserve the assignments to valid cell bodies. An example of this process is illustrated in FIG. 14. In this example, the traced and labeled skeleton (labeled means that all pixels belonging to object 1 have a value=1, all pixels belonging to object 2 have a value=2...) is superimposed on the original unlabeled neurite mask (unlabeled means that all object pixels=1 and all background pixels=0). Then the labeled skeleton pixels are dilated, changing the neurite mask pixel values (all=1) to those of the labeled skeleton (1, 2, ...). Thus the neurite mask becomes labeled. As FIG. 14 also illustrates, the labeled parts of the neurite mask are also separated (do not overlap), and thus are untangled. In the figure, the solid mask (e.g., label=1) is one neurite and the shaded mask (e.g., label=2) is a different neurite, and they can be measured independently of the other. In a further optional embodiment, uncontrolled dilation of the skeleton into the neurite mask is prevented using any suitable technique. An example of this is also provided in FIG. 14; see the left branch of the neurite mask in FIG. 14. The dilation does not completely fill this left branch because regions that do not contain a skeleton are not filled. Based on the teachings herein, those of skill in the art will recognize that other propagation techniques can also be used in accordance with the present invention.

Thus, in a preferred embodiment, the method further comprises transferring the untangled neurite skeletons to the neurite mask, while imposing on the neurite mask the separation achieved in neurite skeleton tracing; the neurite mask is then truncated at the neurite skeleton ends. The features of individual neurites can now be measured and used to validate/select neurites for inclusion in the analysis. Subsequent to selection of the valid neurites, the untangled neurites are preferably re-scanned to remove cross points that correspond to invalidated neurites and to remove branch points that violated the maximum kink angle criterion.

The resulting traced neurites are independent (do not overlap each other), are assigned to specific neuron cell bodies, and can be analyzed. Thus, in a further embodiment, the methods of the invention further comprise analyzing neurite outgrowth. As used herein, the phrase "neurite outgrowth" includes positive neurite outgrowth, neurite outgrowth inhibition, neurite outgrowth degradation, and other changes in neurite morphology. Such neurite morphology ("features") computed for each neuron may include, but are not limited to,
  i. Number of nuclei; aggregate nucleus area, and intensity;
  ii. Cell body size, shape and intensity; number of neurites;
  iii. Aggregate neurite length, width, area, intensity, and branch and cross point counts; distance of branch points from the cell body surface;
  iv. Intensity of reporters in cell body regions in additional channels (e.g., neurotransmitters);
  v. Mathematical combinations of all of the above; and
  vi. Other parameters as discussed below These features can also be used to categorize neurons into user-defined subpopulations based on neuronal features. Analysis of neuron subpopulations is not critical to neuronal analysis, but adds significant value to the methods of the invention. The subpopulations can be identified by the user using nucleus, cell body, and neurite features, and by using information from reporters in additional imaging channels, as described above.

In a preferred embodiment, the methods comprise contacting the cell population comprising neurons with one or more test compounds, and determining the effect of the one or more test compounds on neurite outgrowth. The one or more test compounds can be of any nature, including, but not limited to, chemical and biological compounds and environmental samples. The one or more test compounds may also comprise a plurality of compounds, including but not limited to combinatorial chemical libraries and natural compound libraries. Contacting of the cell population with the one or more test compounds can occur before, after, and/or simultaneously with imaging of the cells, depending on the assay design. For example, in order to carry out kinetic screening, it is necessary to image the cells at multiple time points, and the user may acquire such images before, at the time of, and after contacting of the cells with the test compound.

As will be understood by those of skill in the art, the various images obtained and the various processed images are preferably stored in a database (such as one included in a fluorescence detection device, as discussed below) that can be accessed by a user. The method thus provides overlays of the cellular components (nucleus, cell body, and neurite) that can be displayed on top of the images, and computes cell-level features, including but not limited to status and event features that, for example, access each cell's response to a test compound added to a well containing the neurons. The status features are determined by comparing the value of each measured feature against a reference level, either specified in the assay protocol or measured versus one or more designated control (reference) wells on the plate. The event features for each cell are computed from its status features using any appropriate techniques, including but not limited to Boolean logic specified by the user (see below). During a well scan, the features obtained from the reference well scan can be used to assign response, on the fly, to each neuron.

After all fields have been scanned in a well, the cell-level features can be aggregated and reported as well-level features. The well-level features include, but are not limited to, a statistical analysis of the features for the cells analyzed and a separate statistical analysis of the features for subpopulations of cells. These subpopulations are defined by the events. Events are flexible combinations of nucleus, cell body, and neurite output features, created by the user through, for example, Boolean logic.

In a second aspect, the present invention provides computer readable storage media, for automatically carrying out the methods of the invention on a detection device, such as a fluorescence detection device. As used herein the term "computer readable medium" includes magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

As used herein, "fluorescence detection device" means a device capable of carrying out the imaging required to carry out the invention, including, but not limited to, fluorescence microscopes; light scanning microscopy systems, including but not limited to point scanning, spinning disk, confocal, line scanning, and multi-photon microscopy systems; and epifluorescence microscopes. In a preferred embodiment, a fluorescence microscope is used as part of an automated cell screening system, which further comprises a fluorescence optical system with a stage adapted for holding cells and a means for moving the stage, a digital camera, a light source, and a computer for receiving and processing the digital data from the digital camera, as well as for storing the data in a database and displaying the data.

In a third aspect, the present invention provides detection devices (defined as above) that comprise computer readable storage media (also as described above) for carrying out the methods of the first aspect of the invention.

The present invention may be better understood with reference to the accompanying examples that are intended for purposes of illustration only and should not be construed to limit the scope of the invention, as defined by the claims appended hereto.

EXAMPLES

Overview of One Embodiment of the Method

The flowchart shown in FIG. 1 outlines a sequence of image processing and analysis steps employed in one embodiment of the method. Each step in the method is controlled by parameters that are found in the assay protocol. This protocol can be modified by the user to configure the method for many cell types and assays.

The neuronal specific labeling of the cell constitutes the minimum required fluorescent reporter/imaging channel.

Other imaging channels can be added as desired for a given application. For example, a nucleus channel can be added if nucleus masks are required to fill holes in the cell body masks, or if the user desires to measure the neuronal/non-neuronal population ratio in a mixed culture of cells. Channels can be added to distinguish cells based on the presence of reporters; for example, neurotransmitters or cellular dyes. The description of the method below is of the most general case when all possible imaging channels are being used.

The Channel 1 image (see FIG. 2) is processed first to create nucleus masks. The nucleus features are extracted and the nuclei are validated against criteria specified by the user in the algorithm's protocol.

Figure 3:
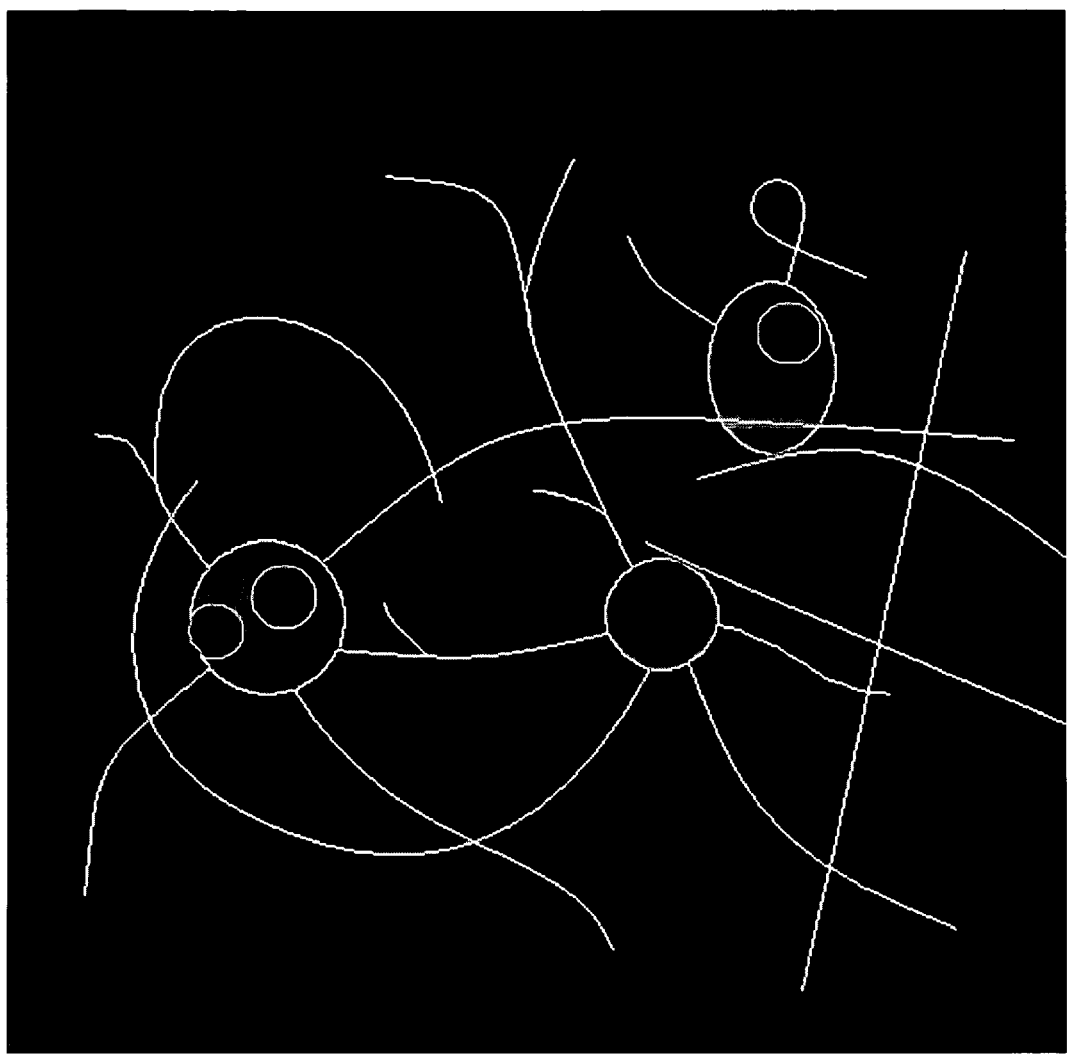
FIG. 3 is an example of a cell body/neurite image obtained according to the methods of the invention.

The Channel 2 image (see FIG. 3) is then processed twice: once to obtain the cell body masks and then to obtain the neurite masks. This processing is independent, using different methods and protocol parameters.

The cell body masks (see FIG. 4), are associated with the valid nuclei by co-localization. This association produces the valid nucleus count for each neuron and a count of non-neuronal cells in the image field. The cell body features are extracted from the cell body masks and are used, along with the valid nucleus count, to validate cell bodies.

Modified (change of size) masks of the valid cell bodies are created for Channels 3-6 and are used to measure the intensities associated with the cell bodies in these channels. The cell bodies are then selected for analysis based on the features measured in Channels 3-6 (this is called "gating"). After cell bodies are selected for analysis, nuclei are again validated to reject any that might belong to cell bodies that were not selected for analysis.

Figure 5:
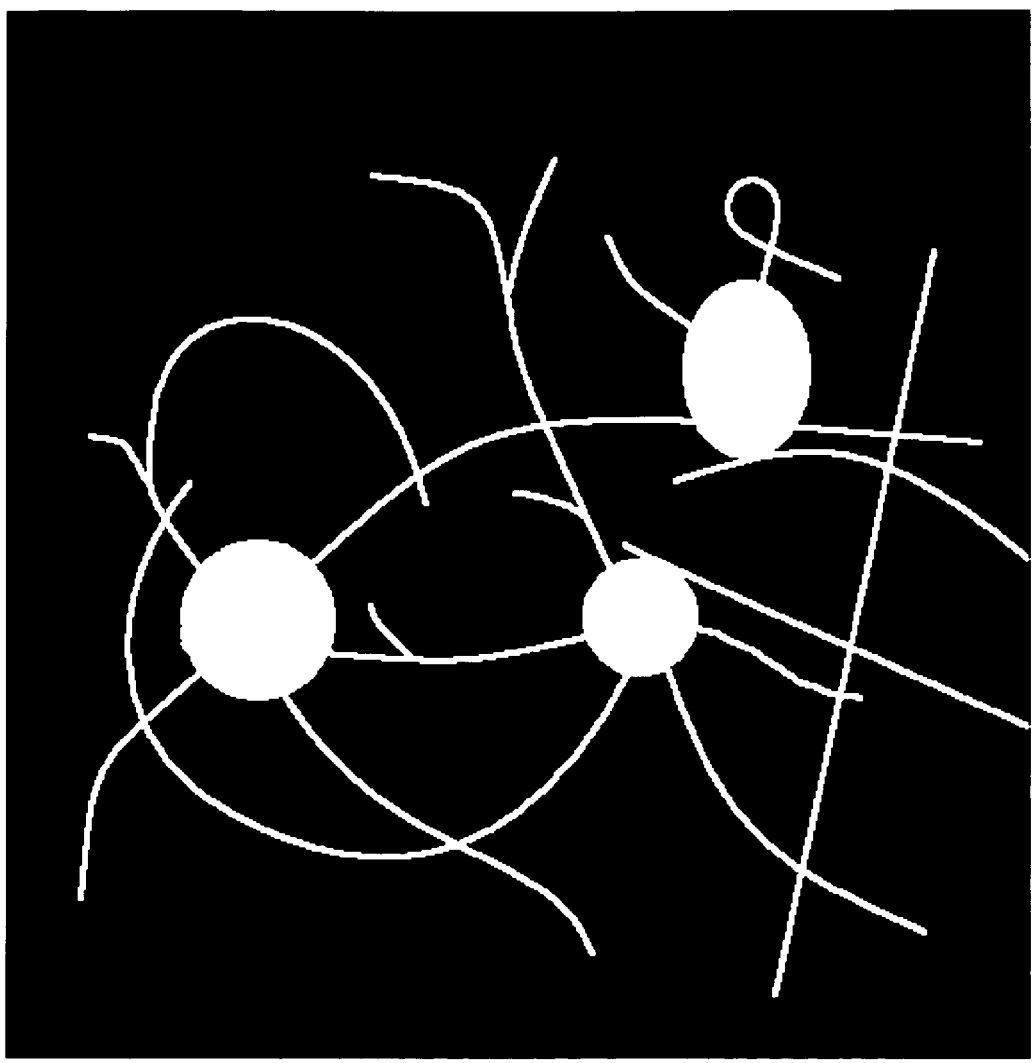
FIG. 5 is an example of a neurite mask obtained according to the methods of the invention.
Figure 7:
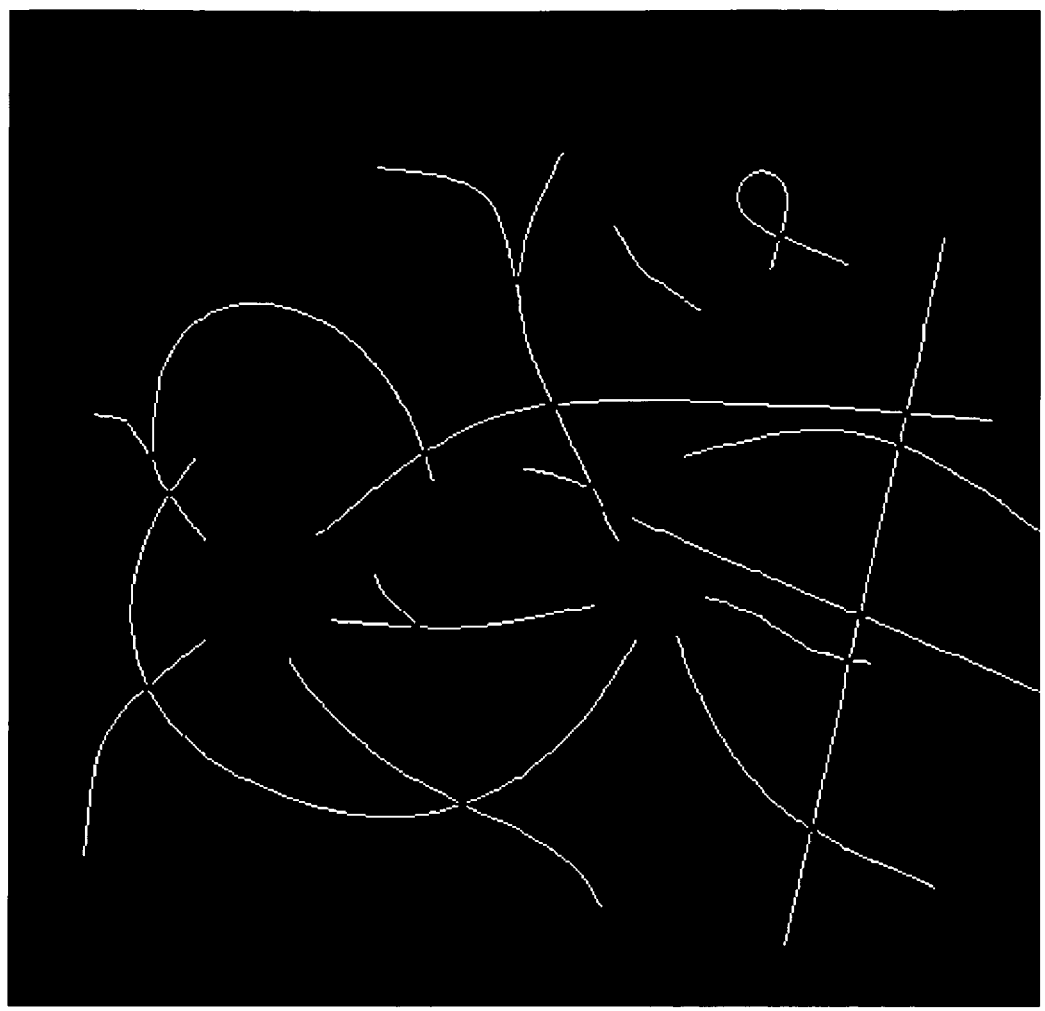
FIG. 7 is an example of a neurite skeleton after removal of critical points.

The neurite mask (see FIG. 5) is created from the Channel 2 image using a threshold derived from the neuron cell body identification. The neurite mask is skeletonized: reduced to single-pixel wide lines that correspond to the medial axes of the neurites and the cell body masks are removed from the skeleton (see FIG. 6) to identify the points where the neurites are attached to the cell bodies (initial points). Critical points where the skeleton branches or crosses itself are also identified and are removed from the skeleton to disassemble it into independent segments (see FIG. 7).

The skeleton segments are reassembled in a process called "tracing," which applies biologically derived rules (such as those described above) at each critical point to untangle the neurites and assign them to the correct neuron cell body. The traced neurites are independent (do not overlap each other) and can be analyzed, and validated. Neurite features computed for each neuron include neurite length, average width, area, intensity, the number of branch and cross points, and the distance of branch points from the neuron cell body surface.

The method completes its analysis of a current field by creating overlays of the cellular components (nucleus, cell body, and neurite) that can be displayed on top of the images, and computing cell-level features.

Included in the cell-level feature are status and event features that access each cell's response to the test compound added to the well. The status features are determined by comparing the value of each measured feature against a reference level, either specified in the assay protocol or measured by the method in designated control (reference) wells on the plate. The event features for each cell are computed from its status features using Boolean logic specified by the user. The processing of reference wells is not shown in the flowchart. The algorithm is used to analyze these first, if they are present on the plate, then sample wells are scanned. During the well scan, the features obtained from the reference well scan are used to assign response, on the fly, to each neuron.

After all fields have been scanned in a well, the cell-level features are aggregated and reported as well-level features. The well-level features include a statistical analysis of the features for all the cells analyzed and a separate statistical analysis of the features for each subpopulation of cells. These subpopulations are defined by the events.

Overview of the Assay Parameters

This section describes each step of the method and its corresponding assay parameters. These assay parameters are listed in the table below. The processing steps in the table refer to the flowchart in FIG. 1.

| Processing Step | Controlling Parameter | Description |
|---|---|---|
| | Use Reference Wells | Reference wells: (0) do not use or (1) use |
| | Use Micrometers | Measure lengths and areas in: (0) pixels or (1) micrometers |
| | Background Correction | Controls background correction. Value is the radius of area over which the slowly varying background is calculated. A value of zero means that no background correction will be performed and analysis will use uncorrected images. |
| Create Nucleus Masks | Reject Nuc Border Objects | Reject nuclei that touch image edges: 0 = No, 1 = Yes |
| Create Nucleus Masks | Nuc Segmentation | Controls the segmentation of touching nuclei: Negative value = Use the intensity method, 0 = Do not segment nuclei, Positive value = Use the shape method |
| Create Nucleus Masks | Nuc Smooth Factor | Degree of image smoothing (blurring) prior to nucleus identification: 0 = Do not smooth image |
| Create Cell Body Masks | Min Cell Body Nuc Common Boundary | Common boundary (in percent) between a nucleus and a cell body must be greater than or equal to this value before the nucleus can be pasted into the cell body |
| Create Cell Body Masks | Reject Cell Body Border Objects | Reject cell bodies that touch image edges: 0 = No, 1 = Yes |
| Create Cell Body Masks | Use Nuc For Cell Body Segmentation | Use valid nuclei as seeds to segment touching cell bodies: 0 = No, 1 = Yes (Use nuclei only), 2 = Yes (Use nuclei with cell body intensity or geometric methods) |
| Create Cell Body Masks | Cell Body Segmentation | Controls the segmentation of touching cell bodies: Negative value = Use the intensity method, 0 = Do not segment cell bodies, Positive value = Use the shape method |
| Create Cell Body Masks | Cell Body Smooth Factor | Degree of image smoothing (blurring) prior to cell body identification: 0 = Do not smooth image |
| Create Cell Body Masks | Cell Body Neurite Removal Size | Half-width (in pixels) of neurites to be removed from cell bodies during creation of cell body masks: 0 = Do not remove neurites |
| Create Cell Body Masks | Cell Body Mask Modifier Ch2 | Number of pixels to modify the size of the Ch2 cell body mask: Negative value = Make mask smaller, 0 = Do not modify mask, Positive value = Make mask larger |
| Create Neurite Masks | Neurite Smooth Factor | Degree of image smoothing (blurring) prior to neurite identification: 0 = Do not smooth image |
| Create Neurite Masks | Neurite Threshold Modifier | Adjusts the neurite threshold intensity relative to that used to identify cell bodies. A negative value identifies dimmer neurites. The threshold derived using the neurite identification modifier is bounded by 1 and 4095. |

-continued

| Processing Step | Controlling Parameter | Description |
|---|---|---|
| Create Neurite Masks | Neurite Detect Method | Method used to detect neurites: 1 = uniform, 2 = binomial, 3 = median, and 4 = top hat |
| Create Neurite Masks | Neurite Detect Radius | Half-width (in pixels) of the largest neurites to be detected in the image: 0 = Do not detect neurites |
| Trace Neurites | Reject Multiply-Traced Neurites | Reject neurites that touch more than one neuron: 0 = neurite will be assigned to a cell body, 1 = neurite will not be analyzed |
| Trace Neurites | Neurite Direction Pixel Count | Number of pixels used to compute the direction of each neurite segment end |
| Trace Neurites | Min Branch Point Separation Pixel Count | Merge each pair of neighboring branch points that are separated by fewer than this number of pixels into a single cross point 0 = Do not merge neighboring branch points |
| Make Overlays | Neurite Point Display Mode | Selects display of neurite branch and cross points: (0) display all, (1) display only branch points, (2) display only cross points |
| Modify Cell Body Masks | Cell Body Mask Modifier Ch3 | Number of pixels to erode or dilate the cell body mask in Ch3 used for gating (negative value makes mask smaller). |
| Modify Cell Body Masks | Cell Body Mask Modifier Ch4 | Number of pixels to erode or dilate the cell body mask in Ch4 used for gating (negative value makes mask smaller). |
| Modify Cell Body Masks | Cell Body Mask Modifier Ch5 | Number of pixels to erode or dilate the cell body mask in Ch5 used for gating (negative value makes mask smaller). |
| Modify Cell Body Masks | Cell Body Mask Modifier Ch6 | Number of pixels to erode or dilate the cell body mask in Ch6 used for gating (negative value makes mask smaller). |

Cell Body Mask Creation

Figure 2:
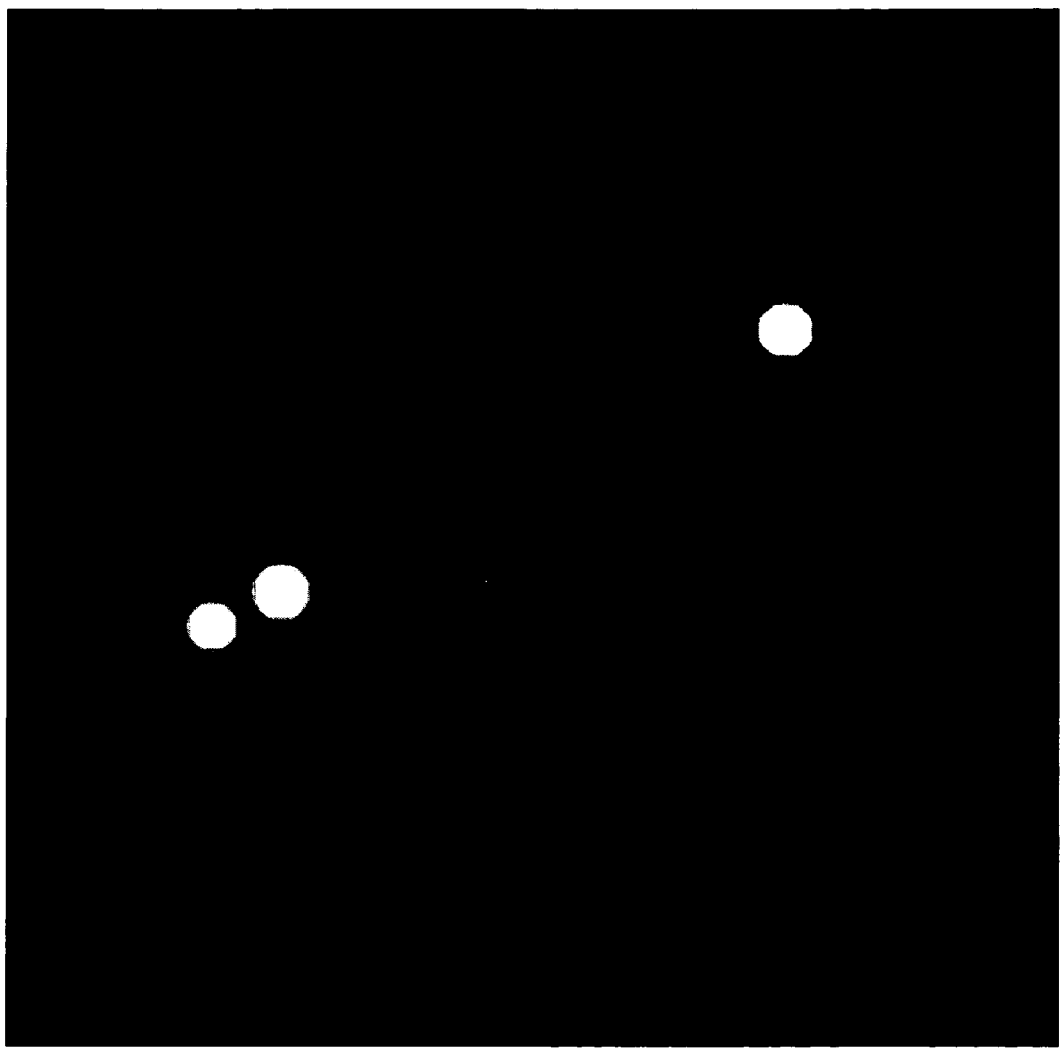
FIG. 2 is an example of a nuclear image obtained according to the methods of the invention.

In some cases, cell body mask creation is complicated by the holes (dark regions) in the cytoplasm image (see FIG. 3) caused by the displacement of the reporters by the nucleus (see FIG. 2). If these holes are present, they are preferably filled. Filling holes in the cell body masks involves the addition of a nucleus-imaging channel (e.g., Channel 1). The masks of objects from Channel 1 are pasted into Channel 2. However, since some nuclei in Channel 1 may not belong to neurons (i.e., are located outside neuronal cell bodies), a co-localization test is performed between Channels 1 and 2 masks before pasting. The assay parameter that configures this test is MinCellBodyNucCommonBoundary.

Figure 4:
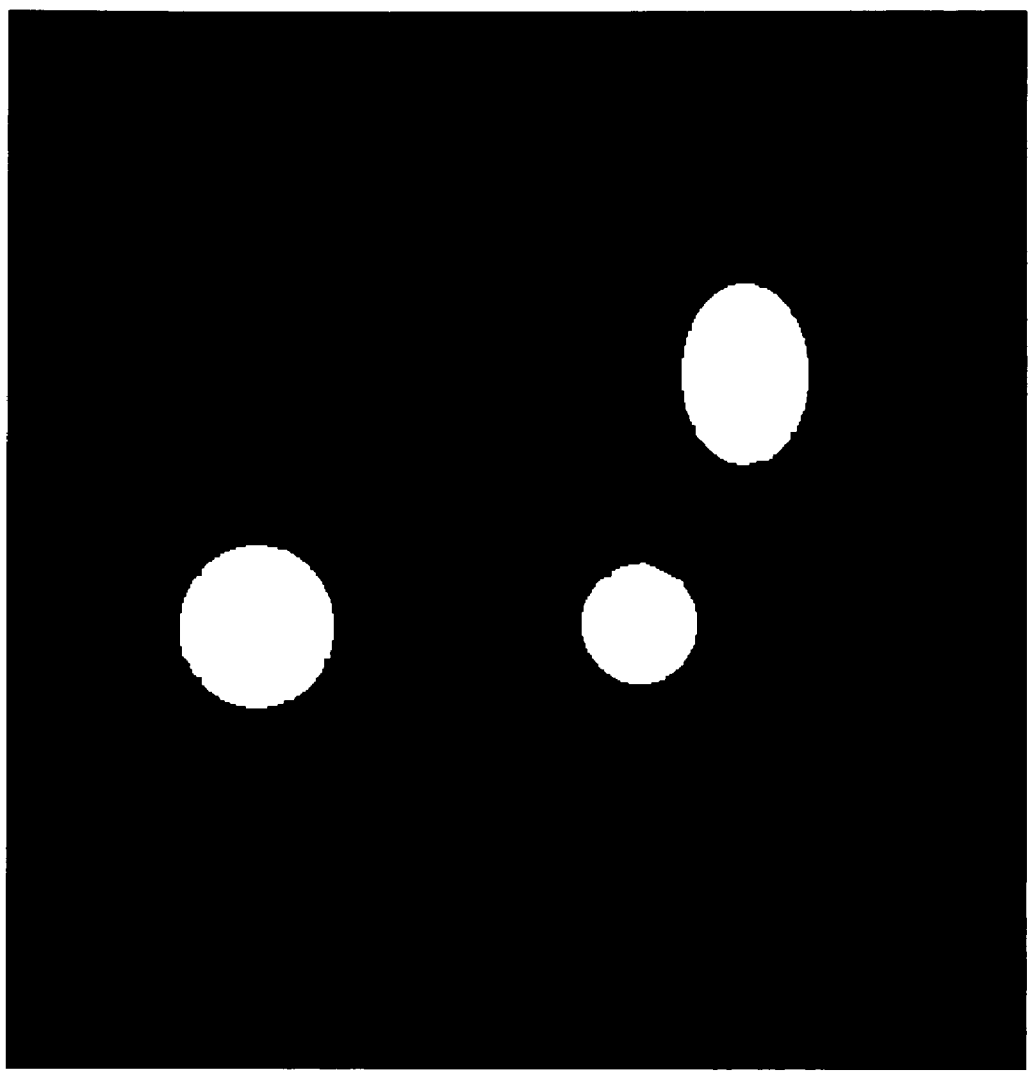
FIG. 4 is an example of a cell body mask obtained according to the methods of the invention.

After cell body holes are filled, any neurites that might be attached to the cell body masks are stripped off using a sequence of erosions and dilations (see FIG. 4). The CellBodyNeuriteRemovalSize assay parameter specifies the stopping criterion for the removal of neurites from the cell body masks.

Following neurite removal, the Channel 2 objects are segmented to separate cell bodies that might touch or overlap. Segmentation is controlled by two assay parameters, CellBodySegmentation and UseNucForCellBodySegmentation. The former specifies how cell body information (e.g., boundary shape or internal intensity distribution) is used in segmentation. The latter indicates that nucleus masks are available and that these should be used to divide the Channel 2 objects into segments.

The features of the Channel 2 objects are then extracted and compared with the neuron cell body validation criteria in the assay protocol. Prior to validation of Channel 1 and Channel 2 objects the method checks if they are touching the edge of the image. Border-touching objects are accepted or rejected as specified by the RejectNucBorderObjects and RejectCellBodyBorderObjects assay parameters.

If desired by the user, the size of each valid cell body mask can be modified as specified by the CellBodyMaskModifierCh2 assay parameter.

Neurite Mask Creation

Figure 8:
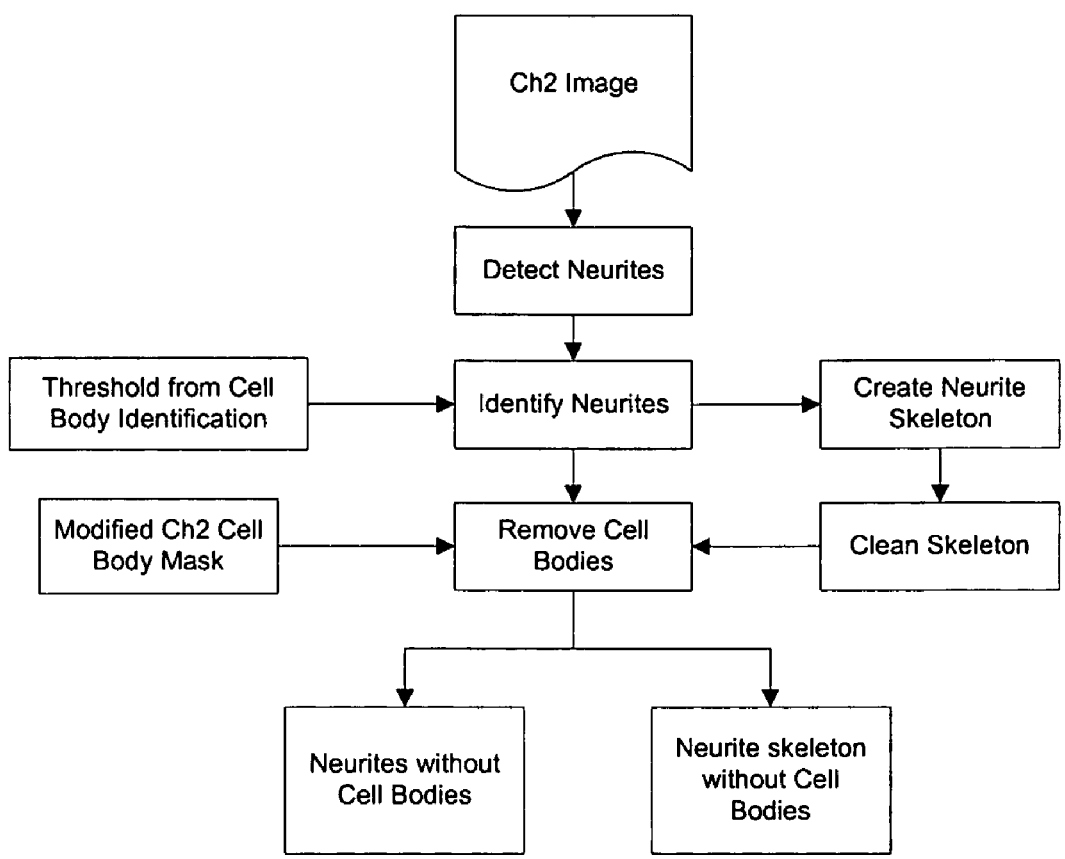
FIG. 8 is a flowchart of exemplary image processing steps for obtaining neurite masks and neurite skeletons.

Neurite masks are derived from the Channel 2 image using the processing steps described in FIG. 8. The neurites are first detected in the Channel 2 gray-scale image. This is an image processing step that removes large objects from the image, making it easier to identify finer ones. Neurite detection is controlled by the NeuriteDetectRadius and NeuriteDetectMethod assay parameters. After detection the neurite mask is created (see FIG. 5) using a threshold determined by the user-specified NeuriteThresholdModifier assay parameter and the threshold value used to identify cell bodies. Depending on the degree and method of detection, the neurite mask may contain cell bodies.

The neurite mask is skeletonized, which reduces each neurite to a single-pixel-wide line along the medial axis of the neurite. The skeleton will be used for neurite tracing, to measure neurite length, and to identify branch and cross points. The neurite mask will be used to measure neurite width, area, and for neurite intensity measurements. The cell body masks are removed from both the neurite mask and its skeleton (see FIG. 6) before this analysis.

Neurite Tracing

Figure 9:
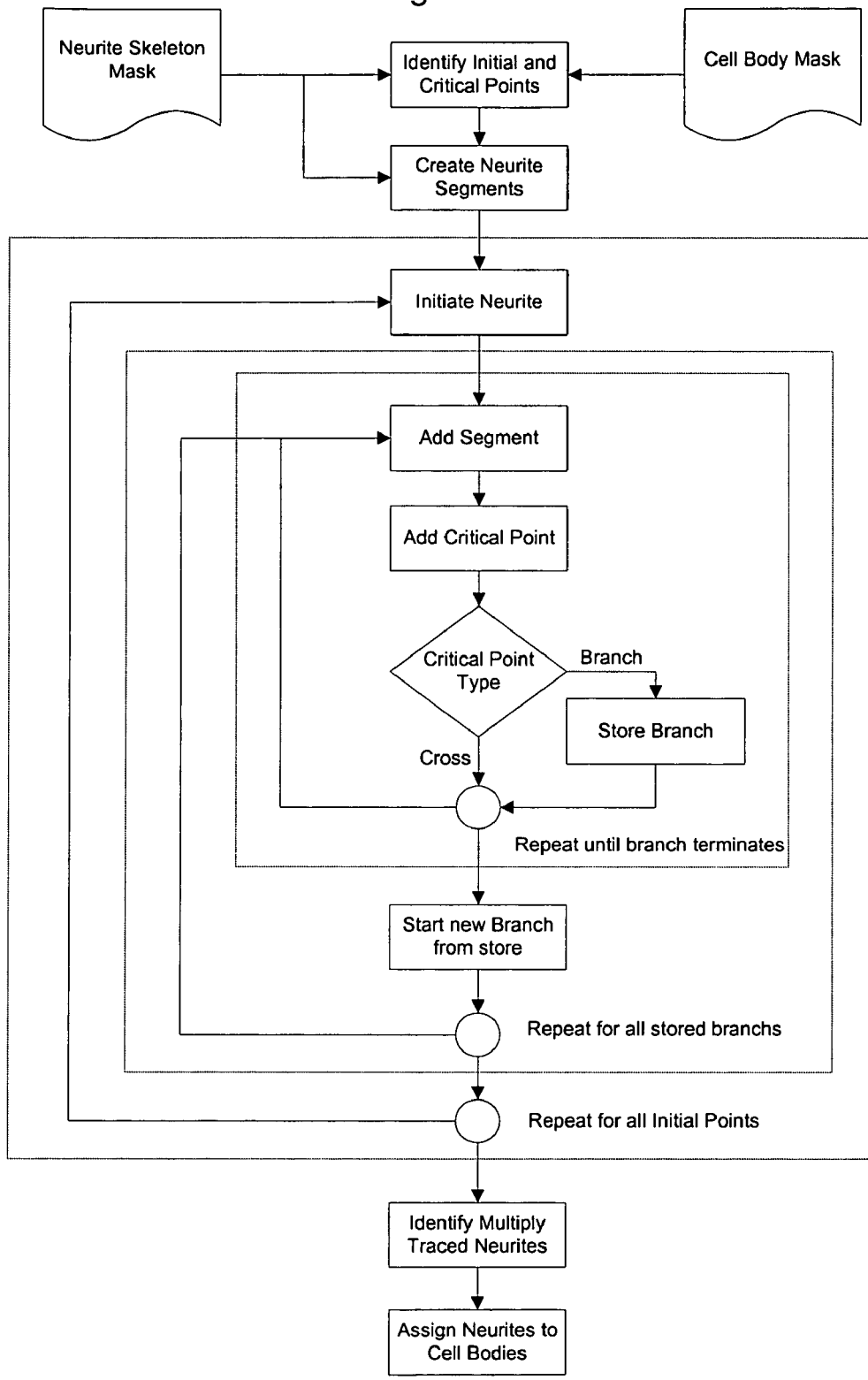
FIG. 9 is a flowchart of exemplary image processing steps for neurite tracing.
Figure 10:
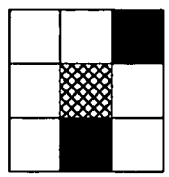
FIG. 10 is a diagram of one method for identifying critical points in the neurite skeleton.
Figure 10:
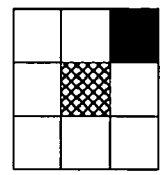
Figure 10:
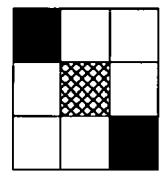
Figure 10:
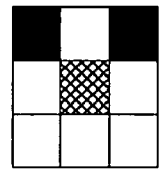
Figure 10:
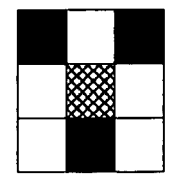
Figure 10:
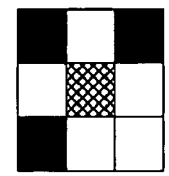
Figure 10:
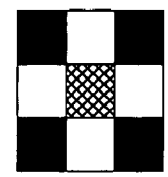

Tracing is the process employed by the method to untangle the neurite skeleton and assign individual neurites to cell bodies. The flowchart for the neurite tracing process is shown in FIG. 9. Neurite tracing begins with identification of the skeleton's initial and critical points. The initial points are the skeleton pixels that touch a cell body surface. These are identified by conditionally dilating the cell body mask by one pixel onto the neurite skeleton mask. Critical points are branch and cross points in the neurite skeleton. They can be identified by counting the number of 8-connected neighbors for each skeleton pixel (8-connected neighbors are skeleton mask pixels in a 3×3 array centered on the test pixel). The skeleton pixel belongs to a critical point if it has more than two 8-connected connected neighbors (see FIG. 10). The neurite skeleton is then disassembled into independent segments by removing the critical points (see FIG. 7).

The initial points, critical points, and skeleton segments are then re-assembled as described in the middle of the flowchart in FIG. 9. The first initial point of the skeleton is selected and its segment is attached. This forms the trunk of the first skeleton tree. If the segment touches a critical point, this is added to the trunk. The critical point is analyzed to determine whether it is a cross point or a branch point, with a cross point being the vertex of four neurite segments and a branch point being the vertex of three. The next segment added to the trunk is chosen by comparing the directions of the critical point's outgoing segments to that of the incoming one. These directions are computed using a linear least squares fit to the N pixels of each segment that are closest to the critical point. The number of pixels, N, used in this fit is specified by the NeuriteDirectionPixelCount assay parameter.

Figure 11:
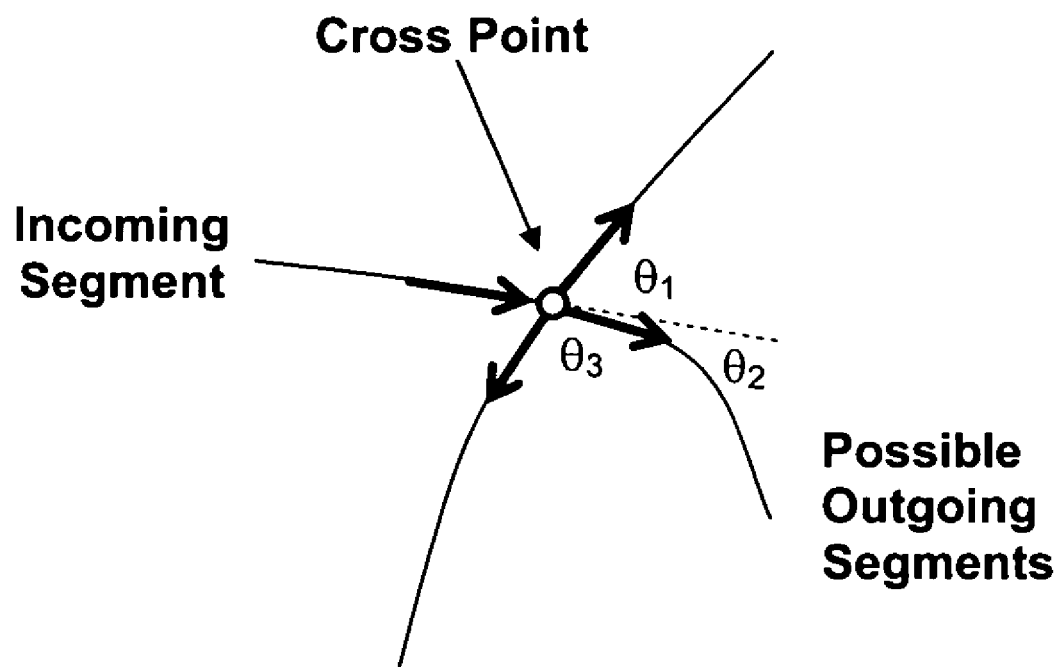
FIG. 11 is a diagram of one embodiment for determining which neurite segment to add to the neurite skeleton trunk.

The outgoing segment that is added to the trunk is the one that minimizes the change in direction, or kink angle (see FIG. 11). The kink angle is measured between an outgoing segment and the projection of the incoming segment, the dashed line in FIG. 11. If no outgoing segment meets the kink angle criterion, the trunk is terminated. If the critical point is a branch point, the outgoing segment not added to the trunk is stored for future use as a branch. When the trunk is completely traced, the stored branches are processed in a similar fashion until none remain. Then another initial point is selected and the process continues until a skeleton tree has been created for each initial point.

Figure 12:
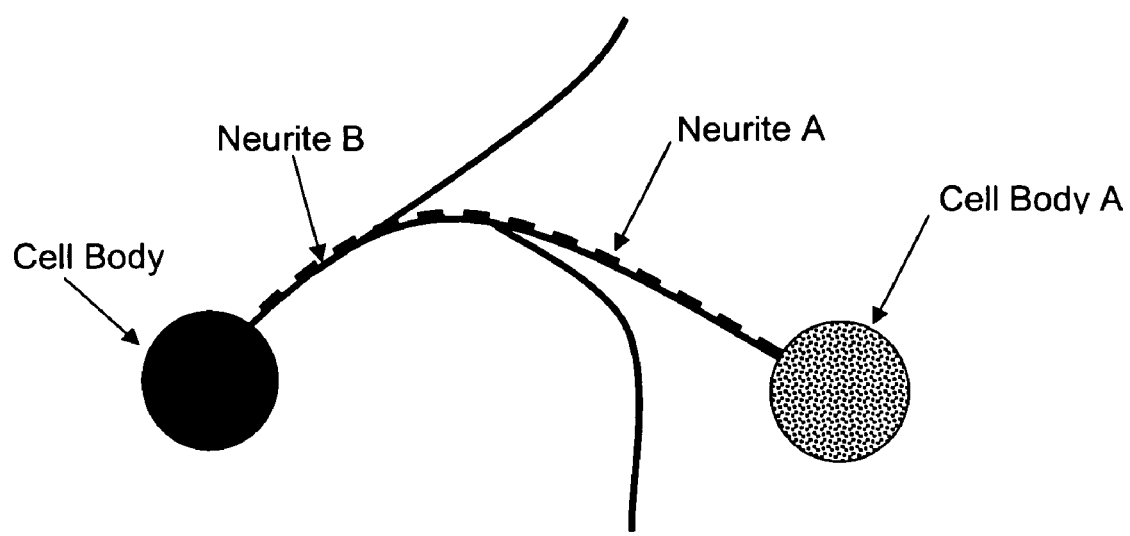
FIG. 12 is a diagram of an exemplary neurite tracing where the neurite touches more than one neuron cell body.

If a neurite touches more than one cell body, it will have more than one initial point and will be traced multiple times. This is illustrated in FIG. 12, which shows two skeleton trees (solid and dotted) that were created for the same neurite. Because of the maximum allowed kink angle, trees with branches will not be identical. In this case the tree with the largest length (solid in FIG. 12) is kept and the other copies are deleted. If there are no branches, the multiply traced skeleton trees will be identical and one of the cell bodies is chosen at random to be the owner of the neurite. The user can specify what happens to multiply traced neurites by setting the RejectMultiplyTracedNeurites assay parameter.

Neurite Analysis

Figure 13:
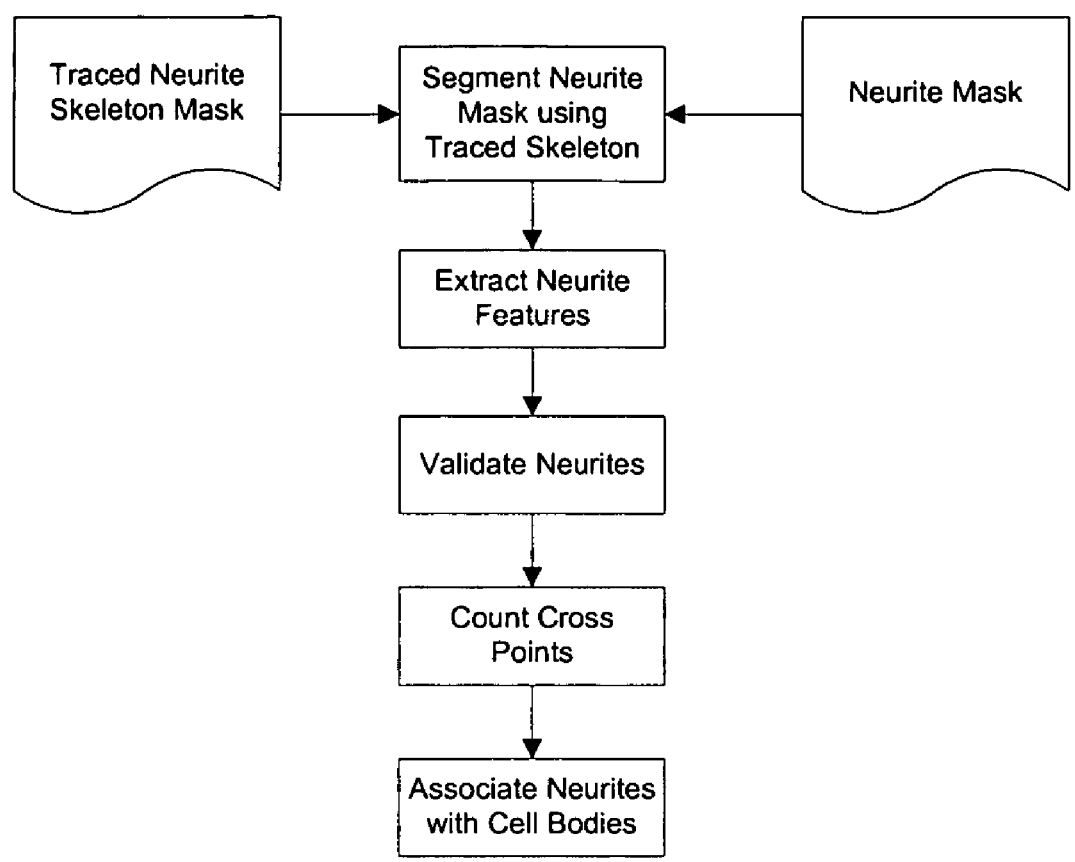
FIG. 13 is a flowchart for neurite association with cell bodies according to one embodiment of the invention.

The steps followed in the analysis of the neurites are illustrated in FIG. 13. As a result of tracing, the neurite skeleton has been re-assembled into a set of independent trees that do not actually overlap at cross points. These trees can be analyzed for length and critical point counts. However, since the skeleton is only one pixel wide, these trees cannot be used to measure area and intensity. These features must be measured using the neurite mask.

Unlike the traced skeleton, the neurite mask still retains its original continuity and must be separated into independent parts before it can be analyzed. This segmentation is done using a variation of the watershed method, with the distance transform of the neurite mask used as the gradient and the traced skeleton as the seed. This is illustrated in FIG. 14. The watershed method used seals off the ends of neurites that do not contain the traced skeleton, and maintains the separation of the neurites at cross points.

Output Features

Individual Object Features

The method measures the features of each individual nucleus, cell body, and neurite. The features of these individual objects are used for object validation and include the following:

Nucleus features (Used for nucleus validation): Area, ShapeP2A (Perimiter$^2$ divided by ($4\pi$ times Area) ), ShapeLWR (Length divided by Width), AvgInten (Average Intensity), and TotalInten (Total Intensity) measured in Channel 1;

Cell body features (Used for cell body validation and gating): Area, ShapeP2A, ShapeLWR, AvgInten, and TotalInten measured in Channel 2; AvgInten and TotalInten within modified cell body masks measured in Channels 3-6; and Neurite features (Used for neurite validation):Length, Width, Cross and Branch Point Counts, AvgInten, TotalInten, and VarInten (Variation in Intensity) measured in Channel 2.

Cell-Level Features

The features of the individual objects are aggregated to obtain cell-level features for each neuron. This process involves computing counts, totals, averages, maxima, etc. for the nuclei and neurites, which can occur in multiple instances within each cell. Cell body features are not aggregated because there is only one cell body per cell.

The cell-level features reported by the method for each cell analyzed are listed in the table below. Included in these features are Event and Status features. These will be described in following sections.

| Feature | Description |
| --- | --- |
| Cell# | Unique cell identification for the plate |
| Top | Starting position of cell body bounding box along y |
| Left | Starting position of cell body bounding box along x |
| Width | Cell body bounding box width |
| Height | Cell body bounding box height |
| XCentroid | Center of the cell body along the X axis |
| YCentroid | Center of the cell body along the Y axis |
| EventTypeProfile | Cell event type |
| EventType1Status | Status of EventType1: 0 = Event did not occur, 1 = Event occurred |
| EventType2Status | Status of EventType2: 0 = Event did not occur, 1 = Event occurred |
| EventType3Status | Status of EventType3: 0 = Event did not occur, 1 = Event occurred |
| CellBodyNucCount | Count of the valid nuclei assigned to the cell body |
| CellBodyNucCountStatus | CellBodyNucCount status: 0 = No response, 1 = High response |
| CellBodyNucTotalArea | Total area (in pixels or micrometers) of the valid nuclei assigned to the cell body |
| CellBodyNucTotalAreaStatus | CellBodyNucTotalArea status: 0 = No response, 1 = High response |
| CellBodyNucTotalInten | Total intensity of the pixels in the valid nuclei assigned to the cell body |
| CellBodyNucTotalIntenStatus | CellBodyNucTotalIntenStatus status: 0 = No response, 1 = High response |
| CellBodyNucAvgInten | Average intensity of the pixels in the valid nuclei assigned to the cell body |
| CellBodyNucAvgIntenStatus | CellBodyNucAvgInten status: 0 = No response, 1 = High response |
| CellBodyArea | Area (in pixels or micrometers) of cell body (not including neurites, if any) |
| CellBodyAreaStatus | CellBodyArea status: 0 = No response, 1 = High response |
| CellBodyShapeP2A | Shape measure of the cell body based on ratio of the perimeter squared to 4PI*area (CellBodyShapeP2A = 1 for circular cell bodies) |
| CellBodyShapeP2AStatus | CellBodyShapeP2A status: 0 = No response, 1 = High response |
| CellBodyShapeLWR | Shape measure of the cell body based on the length-to-width ratio of the object-aligned bounding box |
| CellBodyShapeLWRStatus | CellBodyShapeLWR status: 0 = No response, 1 = High response |
| CellBodyTotalInten | Total intensity of the pixels in the cell body |
| CellBodyTotalIntenStatus | CellBodyTotalInten status: 0 = No response, 1 = High response |
| CellBodyAvgInten | Average intensity of the pixels in the cell body |
| CellBodyAvgIntenStatus | CellBodyAvgInten status: 0 = No response, 1 = High response |
| NeuriteCount | Number of neurites associated with the selected neuron |
| NeuriteCountStatus | Defines neurite count status: (0) is less than or equal to the neurite count threshold and (1) is greater than the neurite count threshold |
| NeuriteTotalLength | Total neurite length for the selected neuron. |
| NeuriteTotalLengthStatus | Defines total neurite length status: (0) is less than or equal to the total neurite length threshold and (1) is greater than the total neurite length threshold |
| NeuriteAvgLength | Average length (in pixels or micrometers) of the neurites assigned to the cell body |
| NeuriteAvgLengthStatus | NeuriteAvgLength status: 0 = No response, 1 = High response |
| NeuriteMaxLengthWithBranches | Maximum length with branches (in pixels or micrometers) of the neurites assigned to the cell body |
| NeuriteMaxLengthWithBranchesStatus | NeuriteMaxLengthWithBranches status: 0 = No response, 1 = High response |
| NeuriteMaxLengthWithoutBranches | Maximum length without branches (in pixels or micrometers) of the neurites assigned to the cell body |
| NeuriteMaxLengthWithoutBranchesStatus | NeuriteMaxLengthWithoutBranches status: 0 = No response, 1 = High response |
| NeuriteTotalArea | Total area (in pixels or micrometers) of the neurites assigned to the cell body |
| NeuriteTotalAreaStatus | NeuriteTotalArea status: 0 = No response, 1 = High response |
| NeuriteAvgWidth | Average width (in pixels or micrometers) of the neurites assigned to the cell body |

-continued

| Feature | Description |
| --- | --- |
| NeuriteAvgWidth-Status | NeuriteAvgWidth status: 0 = No response, 1 = High response |
| NeuriteTotalInten | Total intensity of pixels in the neurites assigned to the cell body |
| NeuriteTotalInten-Status | NeuriteTotalInten status: 0 = No response, 1 = High response |
| NeuriteAvgInten | Average intensity of the pixels in the neurites assigned to the cell body |
| NeuriteAvgInten-Status | NeuriteAvgInten status: 0 = No response, 1 = High response |
| NeuriteVarInten | Standard deviation of the intensity of the pixels in the neurites assigned to the cell body |
| NeuriteVarInten-Status | NeuriteVarInten status: 0 = No response, 1 = High response |
| BranchPointTotal-Count | Total number of branch points in the neurites assigned to the cell body |
| BranchPointTotal-CountStatus | BranchPointTotalCount status: 0 = No response, 1 = High response |
| BranchPointAvg-Count | Average number of branch points per neurite assigned to the cell body |
| BranchPointAvg-CountStatus | BranchPointAvgCount status: 0 = No response, 1 = High response |
| BranchPointAvg-DistFromCellBody | Average distance (in pixels or micrometers) of the branch points from the cell body surface in the neurites assigned to the cell body |
| BranchPointAvg-DistFromCell-BodyStatus | BranchPointAvgDistFromCellBody status: 0 = No response, 1 = High response |
| CrossPointTotal-Count | Total number of cross points in the neurites assigned to the cell body |
| CrossPointTotal-CountStatus | CrossPointTotalCount status: 0 = No response, 1 = High response |
| CrossPointAvg-Count | Average number of cross points per neurite assigned to the cell body |
| CrossPointAvg-CountStatus | CrossPointAvgCount status: 0 = No response, 1 = High response |
| TotalIntenCh3 | Total intensity in Ch3 of the pixels in the modified cell body mask |
| TotalIntenStatusCh3 | TotalIntenCh3 status: 0 = No response, 1 = High response |
| AvgIntenCh3 | Average intensity in Ch3 of the pixels in the modified cell body mask |
| AvgIntenStatusCh3 | AvgIntenCh3 status: 0 = No response, 1 = High response |
| TotalIntenCh4 | Total intensity in Ch4 of the pixels in the modified cell body mask |
| TotalIntenStatusCh4 | TotalIntenCh4 status: 0 = No response, 1 = High response |
| AvgIntenCh4 | Average intensity in Ch4 of the pixels in the modified cell body mask |
| AvgIntenStatusCh4 | AvgIntenCh4 status: 0 = No response, 1 = High response |
| TotalIntenCh5 | Total intensity in Ch5 of the pixels in the modified cell body mask |
| AvgIntenCh5 | Average intensity in Ch5 of the pixels in the modified cell body mask |
| TotalIntenCh6 | Total intensity in Ch6 of the pixels in the modified cell body mask |
| AvgIntenCh6 | Average intensity in Ch6 of the pixels in the modified cell body mask |

Status Features

Figure 15:
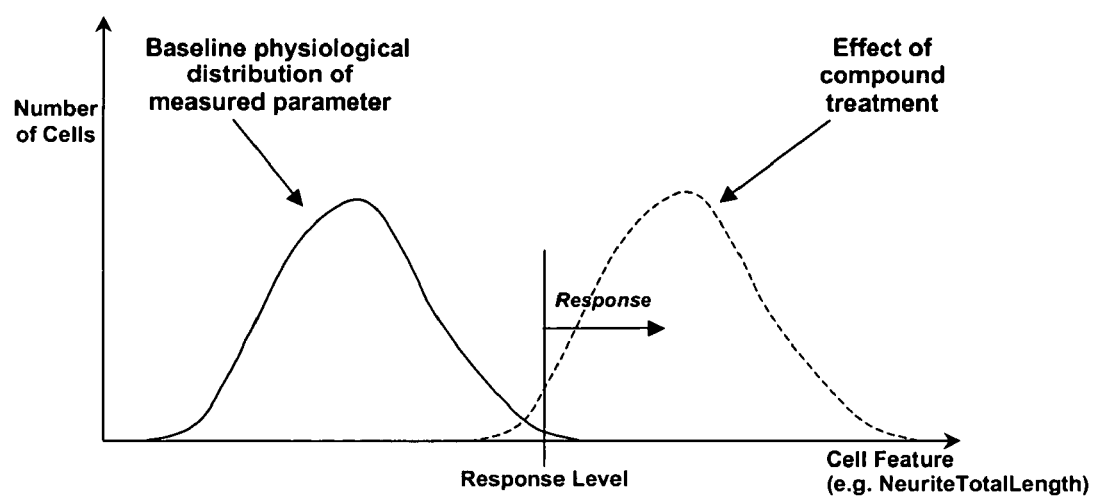
FIG. 15 is an exemplary distribution of primary cell-level features measured over a sample of many untreated cells (solid curve) and treated cells (dashed curve).

When each of the primary cell-level features described above is measured over a sample of many untreated cells, it will likely form a distribution similar to the one shown on the left side of FIG. 15 (solid curve). If this same cell feature is measured for a sample of treated cells, its distribution of values may look like the curve on the right side of FIG. 15 (dashed curve). In this case the cells responded positively to treatment, which shifted the curve to the right. Using the treated and untreated distributions, a response level can be established for each cell feature that will identify the cells that have responded to treatment. The methods available for setting the response levels have been described previously.

Associated with each cell feature is a status feature that indicates the cell's response: If the value of a cell feature is above the response level, the status feature associated with the cell feature is set to 1 (true). If the value of a cell feature is below or equal to the level, the status feature is set to 0 (false). The status features are reported with the Cell-Level Features.

Event Features

The user can define events for each cell using Boolean operators to combine the status features described above. Exemplary Boolean operators are listed in the following table:

| Logic Operators |
| --- |
| NOT |
| AND |
| AND NOT |
| OR |
| OR NOT |
| XOR |
| NAND |
| NOR |

Examples of events include

Event=Neurite Count OR Neurite Total Length

Event=Avg Inten Ch3 AND NOT Avg Inten Ch4

The event features are reported with the cell-level features.

Well-Level Features

The power of High-Content Analysis is that it can identify individual cells in a sample that have responded to treatment in a certain way, and can then compute statistical summaries of the features for just that group of cells (subpopulation analysis). The response to treatment that defines a subpopulation is an event. This response can be simple, directly linked to the change of one cell feature, or complex, a combination of the changes in several cell features.

The well-level features are summarized in the table below. Population features include statistical summaries of each cell-level feature (Mean, Standard Deviation, Standard Error, Coefficient of Variation, and % Responding Cells) for all the cells analyzed in the well. Cell counts and relative abundances are also reported for each of the subpopulations that were defined.

Subpopulation features include statistical summaries of the cell-level feature for only those cells that belong to the subpopulation. Cell counts and relative abundances are also reported for the subpopulation cells that also belong to each of the other subpopulations.

| Feature Type | Population (All Selected Cells) | Subpopulation N (N = 1, 2, and 3) |
| --- | --- | --- |
| Cell Feature Statistics (For each Cell-Level Feature) | Mean<br>Standard Deviation<br>Standard Error<br>Coefficient of Variation<br>% Responding Cells | Mean<br>Standard Deviation<br>Standard Error<br>Coefficient of Variation<br>% Responding Cells |
| Event Type 1 Statistics | Count of selected cells in Subpop 1<br>% of selected cells in Subpop 1 | Count of Subpop 1 cells in Subpop N<br>% of Subpop 1 cells in Subpop N |

-continued

| Feature Type | Population (All Selected Cells) | Subpopulation N (N = 1, 2, and 3) |
|---|---|---|
| Event Type 2 Statistics | Count of selected cells in Subpop 2<br>% of selected cells in Subpop 2 | Count of Subpop 2 cells in Subpop N<br>% of Subpop 2 cells in Subpop N |
| Event Type 3 Statistics | Count of selected cells in Subpop 3<br>% of selected cells in Subpop 3 | Count of Subpop 3 cells in Subpop N<br>% of Subpop 3 cells in Subpop N |

The definitions of the percentages in the table are as follows:

% Subpop 1 Cells=100%×(# of Subpop 1 cells)/(# of Selected Cells)

% Subpop 1 Cells in Subpop N=100%×(# of Subpop 1 Cells in Subpop N)/(# of Subpop 1 Cells)

For completeness the counts and percentages of a subpopulation within itself (e.g., # of Subpop 1 cells in Subpop 1 and % Subpop 1 Cells in Subpop 1) are reported, even though these feature contain no new information.

We claim:

1. An automated method for cell body extension analysis, comprising:
   (a) obtaining cell body images and cell body extension images from multiple cells in a population of cells comprising cells with cell body extensions, wherein the cells and cell body extensions are labeled with reporters, and wherein the cell body images and the cell body extension images are obtained using a fluorescence detection device to detect signals emitted by the reporters;
   (b) processing the cell body images to create cell body masks and to validate cell bodies in the cell body masks, and processing the cell body extension images to create cell body extension masks, which are processed to produce cell body extension skeletons;
   (c) untangling cell body extensions from multiple cells, wherein the untangling comprises:
      (i) identifying end points on the cell body extension skeletons;
      (ii) identifying and removing critical points from the cell body extension skeletons; and
      (iii) tracing the end points and the critical points to untangle cell body extensions in the cell body extension skeletons; and
   (d) assigning untangled cell body extensions to the validated cell bodies.

2. The method of claim 1, wherein the population of cells comprise neurons, and wherein the cell body extensions comprise neurites.

3. The automated method of claim 2, wherein validating cell bodies in the cell body mask comprises segmenting objects in the cell body mask to separate cell bodies.

4. The automated method of claim 2, wherein validating cell bodies in the cell body mask comprises removing neurites from the cell body mask.

5. The method of claim 2, wherein identifying and removing critical points from the neurite skeleton comprises producing a plurality of neurite skeleton segments.

6. The method of claim 2, wherein tracing the end points and critical points to untangle the neurites comprises:
   (i) selecting an initial point and attaching its neurite skeleton segment to form a first neurite skeleton segment;
   (ii) adding to the first neurite skeleton segment a first critical point touching the first neurite skeleton segment;
   (iii) adding to the first critical point a second neurite skeleton segment that minimizes a kink angle at the first critical point and which is in the overall growth direction of the neurite; and
   (iv) repeating steps (ii)-(iii) a desired number of times, wherein the tracing serves to assign neurites to validated cell bodies.

7. The method of claim 2, wherein assigning neurites to validated cell bodies comprises
   (i) tracing the neurite skeletons using available initial points, critical points and neurite skeleton segments;
   (ii) tracing a neurite skeleton for each validated cell body that a neurite touches; and
   (iii) assigning the neurite to the validated cell body on which the neurite would have the overall longest length.

8. The method of claim 2, further comprising obtaining a nuclear image.

9. The method of claim 8 further comprising processing the nuclear image to obtain a nuclear mask.

10. The method of claim 9, further comprising segmenting nuclear mask objects.

11. The method of claim 10, wherein processing the cell body image to create a cell body mask creates a combined cell body/neurite mask.

12. The method of claim 11, further comprising filling holes in cell bodies in the combined cell body/neurite mask.

13. The method of claim 12, wherein filling holes in cell bodies comprises
   (i) creating test ring around each nucleus mask object;
   (ii) measuring contiguities between the test rings and cell body mask objects; and
   (iii) pasting nucleus mask objects that pass a contiguity test into the cell body mask.

14. The method of claim 11 further comprising removing neurites from the combined cell body/neurite mask to create cell body objects.

15. The method of claim 13, wherein validating cell bodies in the combined cell body/neurite mask comprises segmenting cell body mask objects.

16. The method of claim 14, wherein cell body mask objects that do not co-localize with a nucleus are removed from the cell body mask.

17. The method of claim 12, further comprising filling holes in the neurite mask prior to skeletonization.

18. The method of claim 2, wherein obtaining the neurite skeleton mask comprises one or more of:
   (i) pruning the neurite skeletons to remove single-pixel branches;
   (ii) thinning the neurite skeletons to one pixel thick at all points;
   (iii) identifying the critical points as crossing or a branch points based on a number of neurite skeleton segments that meet at each point; and
   (iv) smoothing discontinuities at neurite crossing points so these points are identified as a single cross point instead of a pair of closely spaced branch points.

19. The method of claim 2, wherein the method farther comprises contacting the population of cells comprising neurons with one or more test compounds, and analyzing neurite outgrowth of the untangled neurites.

20. The method of claim 19, wherein analyzing neurite outgrowth comprises determining an effect of one or more test compounds on neurite outgrowth.

21. The method of claim 2, wherein the method farther comprises identification of subpopulations of cells in the cell population.

* * * * *